US008556366B2

United States Patent
Miura

(10) Patent No.: US 8,556,366 B2
(45) Date of Patent: Oct. 15, 2013

(54) INFORMATION PROCESSING SYSTEM, PRINTING APPARATUS, AND INFORMATION PROCESSING METHOD

(75) Inventor: Hirotsuna Miura, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 177 days.

(21) Appl. No.: 13/186,362

(22) Filed: Jul. 19, 2011

(65) Prior Publication Data

US 2012/0019581 A1 Jan. 26, 2012

(30) Foreign Application Priority Data

Jul. 21, 2010 (JP) ................................ 2010-163652

(51) Int. Cl.
*B41J 29/38* (2006.01)
*G06F 11/00* (2006.01)
(52) U.S. Cl.
USPC ............................................. 347/14; 714/4.1
(58) Field of Classification Search
None
See application file for complete search history.

(56) References Cited

U.S. PATENT DOCUMENTS

| 5,502,443 | A | * | 3/1996 | Newberry ...................... 340/3.2 |
| 7,311,379 | B2 | | 12/2007 | Mitsuzawa | |
| 2004/0046830 | A1 | | 3/2004 | Mitsuzawa | |
| 2007/0097161 | A1 | * | 5/2007 | Ejiri et al. ......................... 347/5 |

FOREIGN PATENT DOCUMENTS

JP 2004-025551 A 1/2004

* cited by examiner

*Primary Examiner* — Stephen Meier
*Assistant Examiner* — Alexander C Witkowski
(74) *Attorney, Agent, or Firm* — Maschoff Brennan

(57) ABSTRACT

Each of controllers includes an error management section that generates an error command including an error code indicating the content of an error when the controller detects the error. A host apparatus includes a host controller. If the error command from the master controller and the error command from the slave controller are identical to each other, the host controller displays a single piece of error information on a monitor. Specifically, the single piece of error information includes the error code included in the error command and an error message corresponding to the error code.

18 Claims, 12 Drawing Sheets

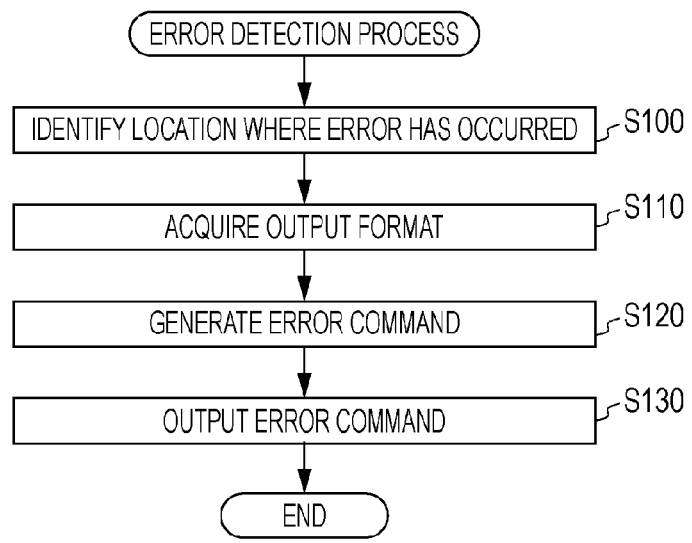
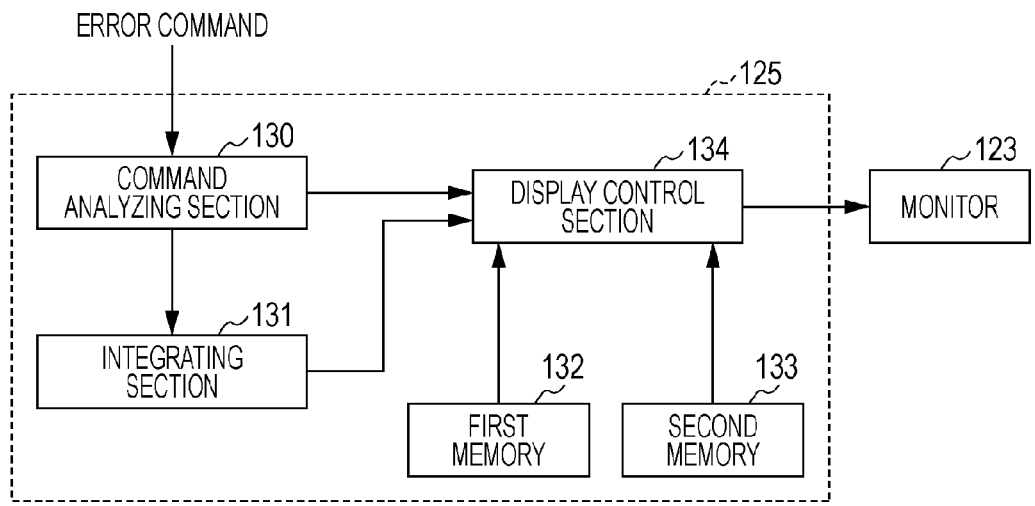

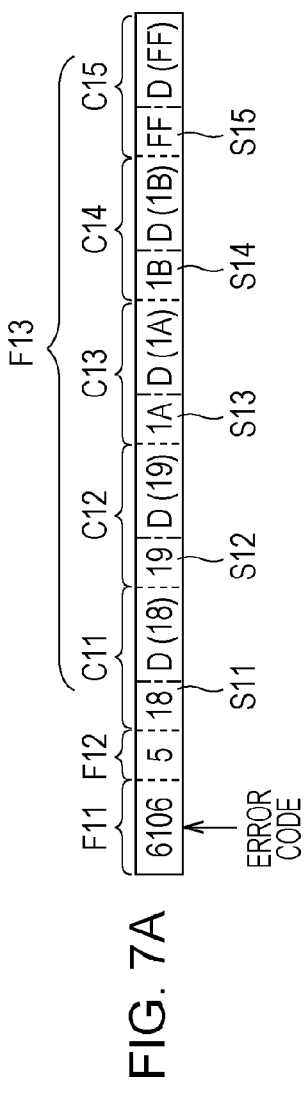
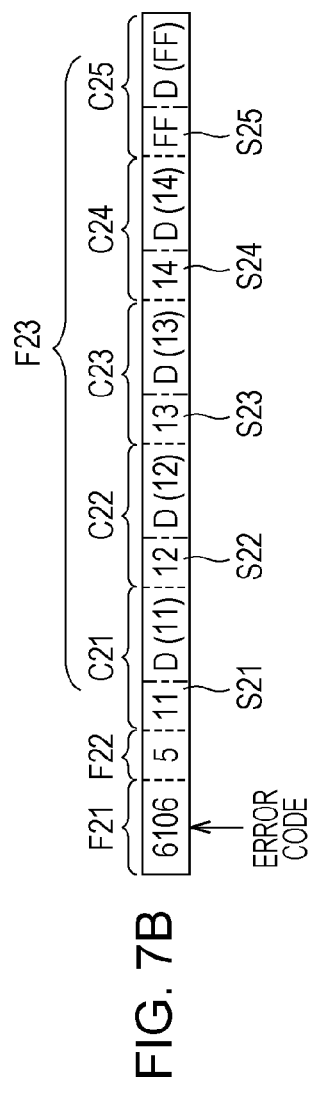
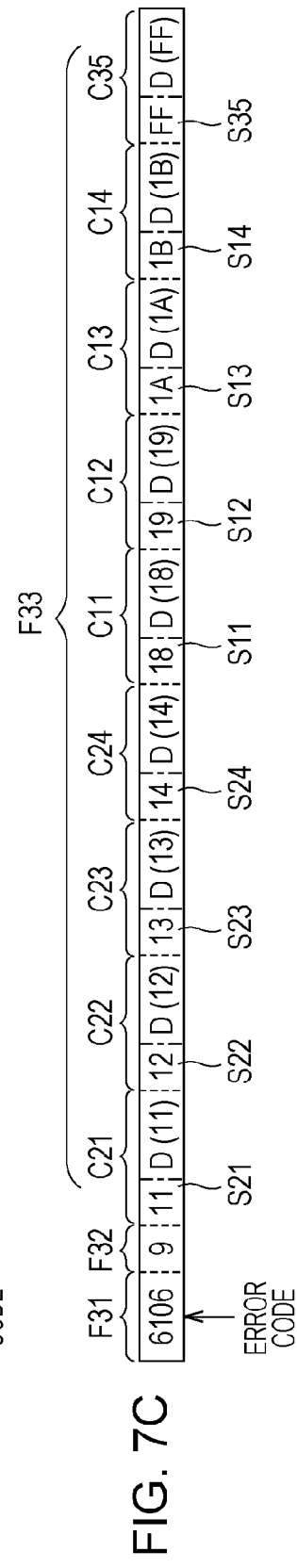
FIG. 7A
FIG. 7B
FIG. 7C

FIG. 8

| ERROR CODE | ERROR MESSAGE |
|---|---|
| ⋮ | ⋮ |
| 5116 | ERROR HAS OCCURRED IN AUTOMATIC NOZZLE CHECKING PROCESS. |
| ⋮ | ⋮ |
| 6096 | ERROR HAS OCCURRED IN CONTROLLER. |
| 6106 | REMAINING INK IS BELOW LOWER LIMIT. |
| ⋮ | ⋮ |
| 6136 | INK CARTRIDGE COVER IS OPEN. |
| ⋮ | ⋮ |

REMAINING INK IS BELOW LOWER LIMIT.
%11s, %12s, %13s, %14s, %15s, %18s, %19s, %1As, %1Bs, %1Cs,%1FFb
PLEASE REPLACE INK CARTRIDGE.

| ERROR CODE | REQUIRE IDENTIFICATION? |
|---|---|
| ⋮ | ⋮ |
| 5116 | YES |
| ⋮ | ⋮ |
| 6096 | YES |
| 6106 | YES |
| ⋮ | ⋮ |
| 6136 | NO |
| ⋮ | ⋮ |

| ERROR CODE | ERROR MESSAGE |
|---|---|
| ⋮ | ⋮ |
| 5116 | ERROR HAS OCCURRED IN AUTOMATIC NOZZLE CHECKING PROCESS IN MASTER CONTROLLER. |
| 5117 | ERROR HAS OCCURRED IN AUTOMATIC NOZZLE CHECKING PROCESS IN SLAVE CONTROLLER. |
| ⋮ | ⋮ |
| 6096 | ERROR HAS OCCURRED IN MASTER CONTROLLER. |
| 6097 | ERROR HAS OCCURRED IN SLAVE CONTROLLER. |
| 6106 | REMAINING INK IS BELOW LOWER LIMIT AT UPPER LEVEL. |
| 6107 | REMAINING INK IS BELOW LOWER LIMIT AT LOWER LEVEL. |
| ⋮ | ⋮ |
| 6136 | INK CARTRIDGE COVER IS OPEN. |
| ⋮ | ⋮ |

FIG. 16

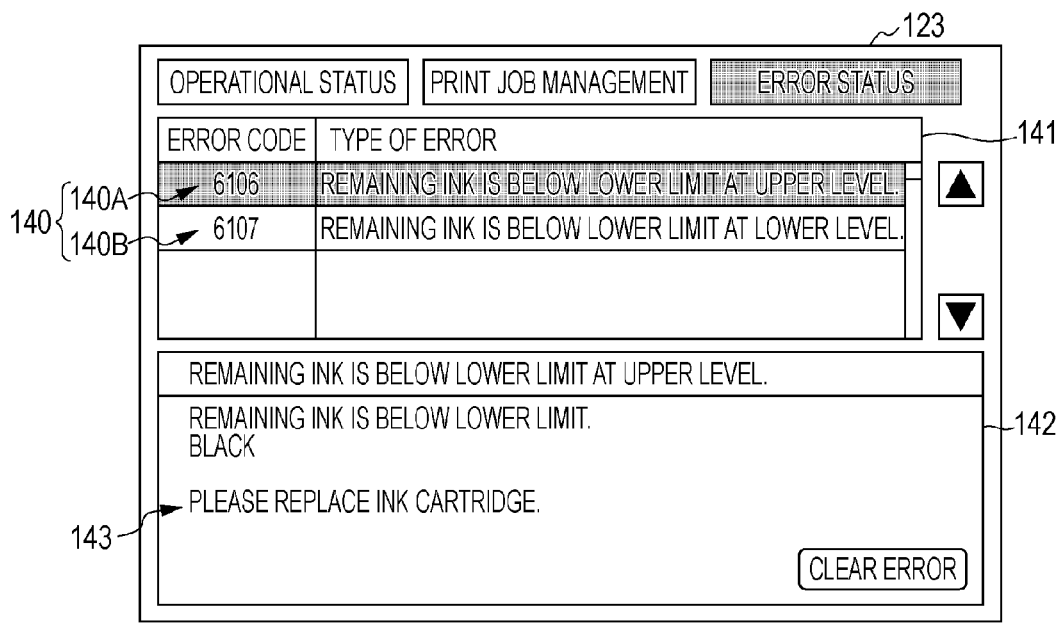

INFORMATION PROCESSING SYSTEM, PRINTING APPARATUS, AND INFORMATION PROCESSING METHOD

This application claims priority to Japanese Patent Application No. 2010-163652, filed Jul. 21, 2010, the entirety of which is incorporated herein by reference.

BACKGROUND

1. Technical Field

The present invention relates to an information processing system and an information processing method for controlling an output mode to be output from an output unit. The invention also relates to a printing apparatus equipped with such an information processing system.

2. Related Art

In the related art, JP-A-2004-25551 proposes a printing apparatus as an example of a large-size printing apparatus that performs printing on a print medium. This printing apparatus includes a plurality of print heads and drive control units corresponding to the respective print heads. The print heads and the drive control units are mounted on a single carriage. The main body of the printing apparatus is provided with a plurality of data processors corresponding to the respective drive control units and a main controller that controls the overall operation of the data processors. Each data processor transfers data to the corresponding drive control unit. Specifically, in the printing apparatus, each print head is provided with a circuit set constituted of one drive control unit and one data processor.

Because the main controller needs to drive the print heads in synchronization with each other, the processing in the data processors may be synchronized. However, since an increasing number of print heads leads to an increase in the control load of the main controller, the main controller itself may conceivably be constituted of multiple print controllers (information processing devices).

In this case, the timing for sending a carriage activation command at a point when the print heads are ready to start performing printing on the print medium and the timing for sending a transport command for transporting the print medium upon completion of the printing operation need to be synchronized between the print controllers. For this reason, one print controller is set to serve as a master (master controller), whereas another print controller is set to serve as a slave (slave controller). When a command received from the slave controller and a command of the master controller are ready, the master controller sends the commands to a drive control device (mechanical controller, etc.) for a carriage system and a transport system. As a result, an ink ejection process of the print heads controlled by the separate controllers and a transport process of the print medium controlled by the drive control device are performed at appropriate timings.

Regarding each of the controllers, when an error occurs in the controller or in a managed section (such as a print head) that the controller manages, the controller outputs an error command including an error code related to the content of the error to a display control apparatus (output control apparatus). For example, when an error occurs in a print head (sometimes referred to as "first print head" hereinafter) managed by the master side, the master controller outputs an error command including an error code indicating the occurrence of the error in the print head and a parameter for identifying the first print head to the display control apparatus. When an error occurs in a print head (sometimes referred to as "second print head" hereinafter) managed by the slave side, the slave controller outputs an error command including an error code indicating the occurrence of the error in the print head and a parameter for identifying the second print head to the display control apparatus.

In this case, the error code included in the error command output from the master controller is identical to the error code included in the error command output from the slave controller. On the other hand, the parameter included in the error command output from the master side (i.e., the parameter for identifying the first print head) is different from the parameter included in the error command output from the slave side (i.e., the parameter for identifying the second print head).

Therefore, the display control apparatus determines that the error command input from the master side and the error command input from the slave side are not the same command. Referring to FIG. 18, a first display region 201 of a monitor 200 whose display mode (output mode) is controlled by the display control apparatus displays error information 202 including the error code included in the error command input from the master side and a message corresponding to the error code, and also displays error information 203 including the error code included in the error command input from the slave side and a message corresponding to the error code. A second display region 204 of the monitor 200 displays details of the error information selected by the user from the error information 202 and the error information 203 displayed in the first display region 201.

In this case, the first display region 201 displays multiple pieces of error information 202 and 203 with identical display (output) contents. Therefore, it is difficult for the user to determine whether multiple errors have occurred in the printing apparatus or only a single error has occurred in the printing apparatus by simply visually checking the first display region 201. This may possibly give the user a feeling of annoyance with regard to the display mode on the monitor 200.

SUMMARY

An advantage of some aspects of the invention is that an information processing system, a printing apparatus, and an information processing method that can prevent multiple pieces of error information with identical output contents from being output from an output unit are provided.

An information processing system according to a first aspect of the invention includes a plurality of information processing devices and an output control apparatus that controls an output mode in an output unit on the basis of a command input from at least one of the information processing devices. Each information processing device includes a command generating unit that generates an error command including an error code indicating the content of an error when the information processing device detects the error. The output control apparatus includes an output-mode control unit. When an error command input from a first information processing device among the plurality of information processing devices and an error command input from a second information processing device that is different from the first information processing device are identical to each other, the output-mode control unit causes the output unit to output a single piece of error information including at least one of the error code included in the error command and a message corresponding to the error code.

According to the above-described configuration, when identical error commands are input to the output control apparatus from the multiple information processing devices, the output unit outputs a single piece of error information including at least one of the error code included in the error command and a message corresponding to the error code. This can prevent multiple pieces of error information with identical output modes from being output from the output unit when identical error commands are input to the output control apparatus from the multiple information processing devices.

An information processing system according to a second aspect of the invention includes a plurality of information processing devices and an output control apparatus that controls an output mode in an output unit on the basis of a command input from at least one of the information processing devices. Each information processing device includes a command generating unit that generates an error command including an error code indicating the content of an error when the information processing device detects the error. The command generating unit of a first information processing device among the plurality of information processing devices generates an error command that is identical to an error command generated by the command generating unit of a second information processing device that is different from the first information processing device when an error whose content is the same as that of an error detected by the second information processing device is detected by the first information processing device. The output control apparatus includes an output-mode control unit. When the error command input from the first information processing device and the error command input from the second information processing device are identical to each other, the output-mode control unit causes the output unit to output a single piece of error information including at least one of the error code included in the error command and a message corresponding to the error code.

According to the above-described configuration, when an error whose content is the same as that of an error detected by the second information processing device is detected by the first information processing device, the first information processing device generates an error command that is identical to an error command generated by the second information processing device and outputs the error command to the output control apparatus. Then, when the error command input from the first information processing device and the error command input from the second information processing device are identical to each other, the output-mode control unit causes the output unit to output a single piece of error information including at least one of the error code included in the error command and a message corresponding to the error code. This can prevent multiple pieces of error information with identical output modes from being output from the output unit when identical error commands are input to the output control apparatus from the multiple information processing devices.

In the information processing system according to the first aspect of the invention, when an error that is not detected by the second information processing device is detected by the first information processing device, the command generating unit of the first information processing device preferably generates an error command including an error code indicating the content of the error and a parameter indicating a location where the error has occurred. When an error that is identical to an error detected by the second information processing device is detected by the first information processing device, the command generating unit of the first information processing device preferably generates an error command including an error code indicating the content of the error but not including a parameter indicating a location where the error has occurred or generates an error command including an error code indicating the content of the error and a parameter identical to a parameter set in the second information processing device.

According to the above-described configuration, if the same error is detected by the information processing devices, the error commands input to the output control apparatus from the multiple information processing devices include identical error codes. In addition, in the case of the same error occurrence location, the error command from the first information processing device includes a parameter that is identical to a parameter included in the error command from the second information processing device, or the error commands from the information processing devices do not include parameters. Therefore, the output control apparatus determines that the error command from the first information processing device and the error command from the second information processing device are identical to each other. This can prevent multiple pieces of error information with identical output modes from being output from the output unit.

The information processing system according to the first aspect of the invention may further include a drive control device that controls a mechanical mechanism on the basis of a command from at least one of the plurality of information processing devices. In this case, when an error in the drive control device or an error in the mechanical mechanism is detected, the drive control device preferably outputs error occurrence information regarding the error to each information processing device. Moreover, when the error occurrence information is input from the drive control device, the command generating unit of the first information processing device preferably generates an error command that is identical to an error command generated by the command generating unit of the second information processing device.

According to the above-described configuration, the drive control device that receives a command from at least one of the plurality of information processing devices controls the driving of the mechanical mechanism. When an error in the drive control device or an error in the mechanical mechanism is detected, the drive control device outputs error occurrence information to each information processing device. Consequently, the output control apparatus receives identical error commands from the respective information processing devices. In this case, since the error commands are identical, the output unit outputs a single piece of error information including at least one of an error code included in the error command and a message corresponding to the error code. Therefore, when an error occurs in the mechanical mechanism or the drive control device, multiple pieces of error information with identical output modes can be prevented from being output from the output unit.

In the information processing system according to the first aspect of the invention, each information processing device preferably manages at least one managed section. In this case, when an error in the information processing device or an error in the at least one managed section is detected, the corresponding command generating unit preferably generates an error command including an error code indicating the content of the error and a parameter corresponding to a location where the error has occurred. Moreover, it is preferable that the output control apparatus include a command determination unit that determines whether or not a first error command input from the first information processing device and a second error command input from the second information processing device are identical to each other, a code determination unit that determines whether or not an error code included in the first error command and an error code included in the second error command are identical to each other if the command determination unit determines that the first error command and the second error command are not identical, and an integrating unit that generates an integrated command including the error code, a parameter included in the first error command, and a parameter included in the second error command if the code determination unit determines that the error code included in the first error command and the error code included in the second error command are identical. Furthermore, the output-mode control unit preferably causes the output unit to output a single piece of error information including at least one of the error code included in the integrated command generated by the integrating unit and a message based on the error code if the code determination unit determines that the error code included in the first error command and the error code included in the second error command are identical.

Sometimes, the error code included in the first error command is identical to the error code included in the second error command, while the parameter included in the first error command is different from the parameter included in the second error command. This implies that, even when the contents of errors detected by the information processing devices are identical, the location where the error is detected by the first information processing device is different from the location where the error is detected by the second information processing device. In this regard, in the first aspect of the invention, when the error code included in the first error command is identical to the error code included in the second error command while the parameter included in the first error command is different from the parameter included in the second error command, an integrated command including the error code, the parameter included in the first error command, and the parameter included in the second error command is generated. The output unit outputs a single piece of error information including at least one of the error code included in the integrated command and a message based on the error code. This can prevent multiple pieces of error information with identical output modes from being output from the output unit.

In the information processing system according to the first aspect of the invention, each error command preferably includes an error code, a plurality of identification codes, and a code indicating a location corresponding to each identification code. In this case, when an error in the information processing device or an error in the at least one managed section is detected, the corresponding command generating unit preferably sets null data for a code corresponding to a first identification code among the plurality of identification codes if the error has not occurred at a location corresponding to the first identification code, and sets a parameter that corresponds to a location corresponding to a second identification code among the plurality of identification codes if the error has occurred at the location corresponding to the second identification code.

Because the data length of an error command not including an identification code changes depending on the number of error occurrence locations, it is difficult for the output control apparatus to analyze the input error command. In this regard, in the first aspect of the invention, the data length of an error command does not change depending on the number of error occurrence locations. Therefore, the output control apparatus can readily analyze the error command, as compared with a case where an error command not including an identification code is input.

In the information processing system according to the first aspect of the invention, each information processing device preferably manages at least one managed section. Moreover, it is preferable that each of the information processing devices further include a code setting unit that sets an error code. In this case, when an error in the information processing device or an error in the at least one managed section is detected, the corresponding code setting unit preferably sets an error code based on the information processing device from which the content of the error, a location where the error has occurred, and an error command are output. Furthermore, the command generating unit preferably generates the error command including the error code set by the code setting unit.

According to the above-described configuration, when an error in the first information processing device or an error in the at least one managed section managed by the first information processing device is detected, the first information processing device generates an error code based on the content of the error, the error occurrence location, and the first information processing device, and outputs an error command including the error code. On the other hand, when an error in the second information processing device or an error in the at least one managed section managed by the second information processing device is detected, the second information processing device generates an error code based on the content of the error, the error occurrence location, and the second information processing device, and outputs an error command including the error code. Specifically, even when the content of the error detected by the first information processing device and the content of the error detected by the second information processing device are identical, the error code generated by the first information processing device and the error code generated by the second information processing device may be different from each other. Therefore, even when the output control apparatus receives the error commands from the information processing devices, since the error codes included in the error commands are different from each other, the output control apparatus recognizes the error commands as different errors. Consequently, multiple pieces of error information with different error codes can be output from the output unit.

In the information processing system according to the first aspect of the invention, it is preferable that the output control apparatus further include a storage unit that stores different messages for individual error codes. In this case, when an error command is input, the output-mode control unit preferably reads a message corresponding to the error code included in the error command from the storage unit and causes the output unit to output error information including the read message.

According to the above-described configuration, the message based on the error code included in the error command input to the output control apparatus is output from the output unit.

A printing apparatus according to a third aspect of the invention includes a plurality of print heads that perform printing on a print medium by using a fluid, a mechanical mechanism having a transport unit that moves the print medium relatively to the print heads, and the aforementioned information processing system. The first information processing device controls a first print head among the plurality of print heads. The second information processing device controls a second print head that is different from the first print head.

According to the above-described configuration, when an error occurs within the printing apparatus, error information according to the content of the error is output from the output unit.

A fourth aspect of the invention provides an information processing method in an information processing system including a plurality of information processing devices and an output control apparatus that controls an output mode in an output unit on the basis of a command input from at least one of the information processing devices. The method includes causing the information processing devices that have detected an error to generate error commands each including an error code indicating the content of the error and to output the error commands to the output control apparatus, and outputting a single piece of error information from the output unit when the error command input to the output control apparatus from a first information processing device among the plurality of information processing devices and the error command input to the output control apparatus from a second information processing device that is different from the first information processing device are identical to each other. Specifically, the single piece of error information includes at least one of the error code included in the error command and a message corresponding to the error code.

Accordingly, advantages similar to those of the above-described information processing system can be achieved.

A fifth aspect of the invention provides an information processing method in an information processing system including a plurality of information processing devices and an output control apparatus that controls an output mode in an output unit on the basis of a command input from at least one of the information processing devices. The method includes causing a first information processing device among the plurality of information processing devices to generate an error command including an error code indicating the content of an error and to output the error command to the output control apparatus when the error is detected by the first information processing device, causing a second information processing device that is different from the first information processing device to generate an error command identical to the error command generated by the first information processing device and to output the error command to the output control apparatus when an error whose content is the same as that of the error detected by the first information processing device is detected by the second information processing device, and outputting a single piece of error information from the output unit when the error command input to the output control apparatus from the first information processing device and the error command input to the output control apparatus from the second information processing device are identical to each other. Specifically, the single piece of error information includes at least one of the error code included in the error command and a message corresponding to the error code.

Accordingly, advantages similar to those of the above-described information processing system can be achieved.

BRIEF DESCRIPTION OF THE DRAWINGS

The invention will be described with reference to the accompanying drawings, wherein like numbers reference like elements.

FIG. 5 is a flow chart illustrating an error detection routine in the first embodiment.

FIG. 6 is a block diagram illustrating the configuration of a host controller.

FIGS. 7A, 7B, and 7C schematically illustrate data configurations of error commands.

FIG. 8 illustrates a table that stores error codes and error messages in correspondence with each other.

FIG. 9 schematically illustrates an example of a display format.

FIG. 15 is a table that stores error codes and error messages in correspondence with each other.

FIG. 16 schematically illustrates an example of an error screen.

DESCRIPTION OF EXEMPLARY EMBODIMENTS

First Embodiment

An information processing system of a lateral-type ink jet printer according to a first embodiment of the invention will be described below with reference to FIGS. 1 to 11.

Figure 1:
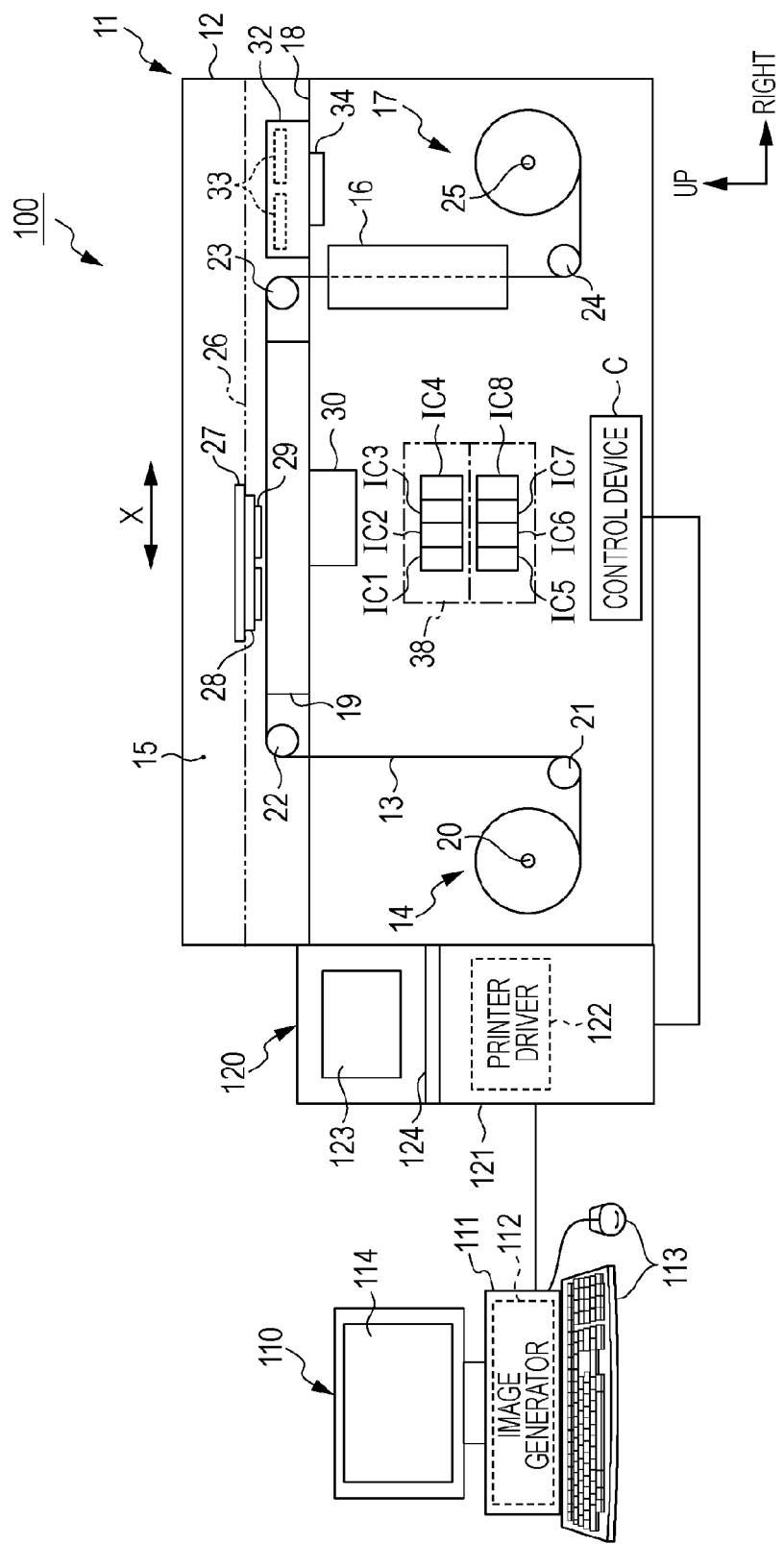
FIG. 1 is a side view schematically illustrating a printing system according to a first embodiment.

FIG. 1 schematically illustrates a printing system equipped with the lateral-type ink jet printer. As shown in FIG. 1, a printing system 100 includes an image generating apparatus 110 that generates image data, a host apparatus 120 that generates print data on the basis of the image data received from the image generating apparatus 110, and a lateral-type ink jet printer (sometimes simply referred to as "printer" hereinafter) 11 serving as a printing apparatus that prints an image based on the print data received from the host apparatus 120.

The image generating apparatus 110 is, for example, a personal computer and includes an image generator 112 that causes a central processing unit (CPU) within a main body 111 of the personal computer to execute an image generating software program. A user may activate the image generator 112 and operate an input device 113 so as to generate an image on a monitor 114 and input a command for printing the image. Then, image data corresponding to the image is sent to the host apparatus 120 via a predetermined communication interface.

The host apparatus 120 is, for example, a personal computer and includes a printer driver 122 that causes a CPU within a main body 121 of the personal computer to execute a printer-driver software program, and an operable section 124 to be operated by the user. The printer driver 122 generates print data on the basis of the image data received from the image generating apparatus 110 and sends the print data to a control device C provided in the printer 11. The control device C controls the printer 11 on the basis of the print data received from the printer driver 122 and causes the printer 11 to print the image on the basis of the print data. A monitor 123 displays a menu screen for inputting control setting values to the printer 11, an error screen for informing the user of an error occurring in the printer 11, and the image to be printed.

Next, the configuration of the printer 11 shown in FIG. 1 will be described. In the following description, the terms "left-right direction" and "up-down direction" are used on the basis of directions indicated by arrows in FIG. 1. Moreover, the near side and the far side in FIG. 1 will respectively be defined as the front side and the rear side.

As shown in FIG. 1, the printer 11 includes a main-body casing 12 having a rectangular-parallelepiped shape. The main-body casing 12 contains a feeder 14 that feeds a long continuous sheet 13 serving as an example of a print medium, a print chamber 15 in which a printing process is performed on the sheet 13 by ejecting ink (liquid) thereto, a dryer 16 that dries the sheet 13 having the ink adhered thereon in the printing process, and a winder 17 that takes up the dried sheet 13.

Specifically, a tabular base 18 that partitions the interior of the main-body casing 12 into an upper chamber and a lower chamber is provided at a slightly upper position within the main-body casing 12. A space above the tabular base 18 serves as the print chamber 15 in which a rectangular plate-like support member 19 is supported on the tabular base 18. In a space below the tabular base 18, the feeder 14 is disposed at the left side, that is, the upstream side in a transport direction of the sheet 13, and the dryer 16 and the winder 17 are disposed at the right side, that is, the downstream side.

The feeder 14 is provided with a rotatable feeding shaft 20 extending in the front-rear direction. The sheet 13 is preliminarily rolled around the feeding shaft 20 and is supported by the feeding shaft 20 so as to be rotatable together therewith. Specifically, when the feeding shaft 20 rotates, the sheet 13 is fed from the feeder 14. The sheet 13 fed from the feeder 14 is hooked around a first roller 21 located to the right of the feeding shaft 20 and is guided upward.

A second roller 22 provided parallel to the first roller 21 located therebelow is disposed to the left of the support member 19 and is aligned with the first roller 21 in the up-down direction. The sheet 13, the transport direction of which is changed to a vertically upward direction by the first roller 21, is hooked around the second roller 22 from the left lower side so that the transport direction is changed to a horizontally rightward direction, causing the sheet 13 to slide on an upper surface of the support member 19.

A third roller 23 provided parallel to the second roller 22 at the left side thereof is disposed to the right of the support member 19 and faces the second roller 22 with the support member 19 interposed therebetween. Each of the second roller 22 and the third roller 23 is positionally adjusted so that the top of the peripheral surface thereof is aligned with the upper surface of the support member 19 in the height direction.

The sheet 13, the transport direction of which is changed to the horizontally rightward direction by the second roller 22 within the print chamber 15, is transported rightward, i.e., downstream, while sliding on the upper surface of the support member 19, and is subsequently hooked around the third roller 23 from the right upper side so that the transport direction is changed to a vertically downward direction, whereby the sheet 13 is transported toward the dryer 16 located below the tabular base 18. Then, the sheet 13 passes through the dryer 16 and is dried therein. After being transported further in the vertically downward direction, the sheet 13 is hooked around a fourth roller 24 so that the transport direction is changed to the horizontally rightward direction. Finally, a winding shaft 25 of the winder 17 disposed to the right of the fourth roller 24 is rotated by a driving force of a transport motor (driving source) 61 (see FIG. 3) so that the sheet 13 is taken up and rolled around the winding shaft 25. Accordingly, in this embodiment, the feeder 14 and the winder 17 constitute a transport unit.

Guide rails 26 (indicated by a dot-chain line in FIG. 1) forming a pair and extending in the left-right direction are respectively provided at front and rear sides of the support member 19 within the print chamber 15. The upper surfaces of the guide rails 26 are disposed higher than the upper surface of the support member 19 and support a rectangular carriage 27 in a reciprocable manner along the two guide rails 26 in a main scanning direction X (i.e., the left-right direction in FIG. 1) in response to a driving force from first and second carriage motors 62 and 63 (see FIG. 3). The lower surface of the carriage 27 supports a plurality of recording heads (print heads) 29 via a support plate 28. In this embodiment, the first carriage motor 62 will be referred to as "first CR motor 62", and the second carriage motor 63 will be referred to as "second CR motor 63".

A specific area extending from the left end to the right end of the support member 19 serves as a print area, and the sheet 13 is intermittently transported by a distance equivalent to this print area. As the carriage 27 reciprocates, the recording heads 29 eject ink onto the sheet 13 stopped above the support member 19, thereby performing printing on the sheet 13.

During the printing process, a suction device 30 provided below the support member 19 is driven so that a suction force produced by negative pressure in multiple suction holes formed in the upper surface of the support member 19 causes the sheet 13 to be attached to the upper surface of the support member 19 by suction. When one printing process on the sheet 13 is completed, the negative pressure of the suction device 30 is released so that the sheet 13 can be transported.

In the print chamber 15, a maintenance device 32 for performing maintenance on the recording heads 29 when printing is not performed is provided in a non-print area located to the right of the third roller 23. The maintenance device 32 includes a cap 33 for each recording head 29 and a lifting-lowering unit 34. By driving the lifting-lowering unit 34, each cap 33 can be moved between a capping position at which the cap 33 is brought into contact with a nozzle face 35 (see FIG. 2) of the corresponding recording head 29 and a retreated position at which the cap 33 is positioned away from the nozzle face 35.

Figure 2:
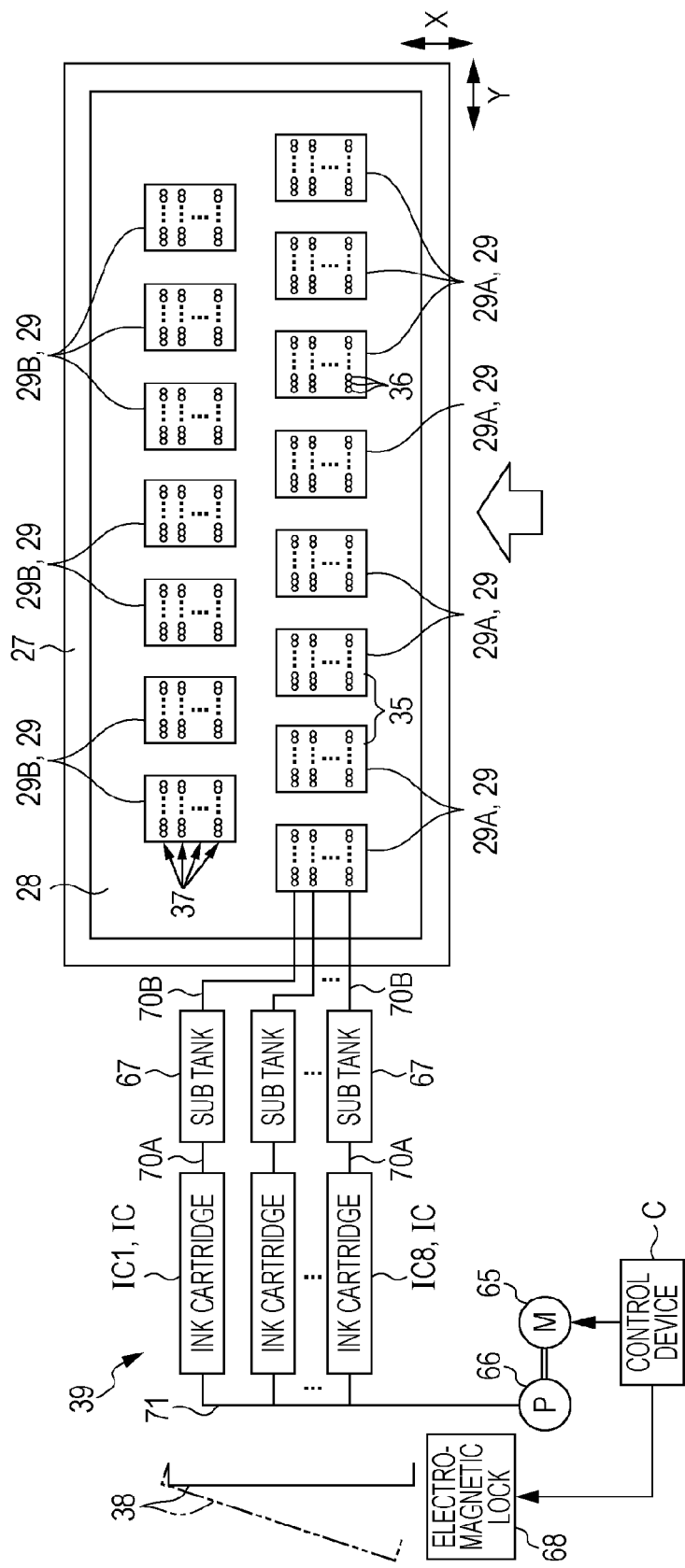
FIG. 2 schematically illustrates the configuration of a nozzle face of recording heads and an ink supply device.

Furthermore, multiple (e.g., eight) ink cartridges IC1, IC2, IC3, IC4, IC5, IC6, IC7, and IC8 containing inks of different colors are detachably fitted in the main-body casing 12. Among the ink cartridges IC1 to IC8, some (e.g., four in this embodiment) ink cartridges IC1 to IC4 are fitted at an upper level, whereas the remaining (e.g., four in this embodiment) ink cartridges IC5 to IC8 are fitted at a lower level. The ink cartridges IC1 to IC8 are connected to the recording heads 29 via ink supply channels 70A (see FIG. 2) or the like, and the recording heads 29 eject the inks supplied from the ink cartridges IC1 to IC8. Specifically, the printer 11 according to this embodiment is capable of performing color printing using eight color inks. As shown in FIGS. 1 and 2, an openable-closable cover 38 is provided at a position corresponding to where the ink cartridges IC1 to IC8 are disposed in the main-body casing 12. The ink cartridges IC1 to IC8 can each be replaced by opening the cover 38.

The inks contained in the eight ink cartridges IC1 to IC8 include, for example, black (K) ink, cyan (C) ink, magenta (M) ink, and yellow (Y) ink. A configuration in which a moisturizing-liquid cartridge that contains a moisturizing liquid is provided is also permissible. The types of inks (i.e., the number of colors) to be used are changeable, where appropriate. For example, a configuration in which monochrome printing is performed using black ink alone or a configuration in which two color inks or three or more freely-chosen color inks other than the eight color inks is also permissible.

The ink cartridges IC1 to IC8 are electrically connected to the control device C via a cartridge holder (not shown). Information regarding the amount of remaining ink of each color is written into a nonvolatile memory cell (see FIG. 3) mounted to each of the ink cartridges IC1 to IC8.

FIG. 2 schematically illustrates the multiple recording heads 29 provided at the lower surface of the carriage 27 and an ink supply device 39 that supplies the respective inks to the recording heads 29. As shown in FIG. 2, the support plate 28 supported at the lower surface of the carriage 27 supports multiple (15 in this embodiment) recording heads 29 arranged in a zigzag pattern in a width direction (i.e., the front-rear direction) that is orthogonal to the transport direction of the sheet 13 (i.e., a direction indicated by a white arrow in FIG. 2). In the nozzle face 35 serving as the lower surface of each recording head 29, multiple (eight in this embodiment) nozzle arrays 37 are arranged at a predetermined pitch in the main scanning direction X. Each of the nozzle arrays 37 includes multiple nozzles 36 arranged in a single row in the front-rear direction (i.e., a sub scanning direction Y).

The printer 11 according to this embodiment is provided with the ink supply device 39 for supplying the inks of the respective colors to the corresponding recording heads 29. The ink supply device 39 includes a pump motor 65, a pressure pump 66, the ink cartridges IC1 to IC8, sub tanks 67, and the cartridge holder (not shown).

The ink cartridges IC1 to IC8 fitted in the cartridge holder are connected to the sub tanks 67 via the ink supply channels 70A (such as tubes). The sub tanks 67 are connected to the recording heads 29 via ink supply channels 70B (such as tubes). However, FIG. 2 only illustrates the relationship of the connection between the multiple (e.g., eight) sub tanks 67 and one of the recording heads 29. In actuality, the same number of ink supply channels 70B (such as tubes) as that of the recording heads 29 extend from the eight sub tanks 67, such that each ink supply channel 70B is connected to the corresponding recording head 29. The inks of the respective colors from the ink cartridges IC1 to IC8 are supplied to the corresponding recording heads 29 via the sub tanks 67 and the ink supply channels 70B. Each recording head 29 appropriately ejects the corresponding ink from the nozzles 36 thereof, thereby performing printing on the sheet 13.

Furthermore, the ink cartridges IC1 to IC8 fitted in the cartridge holder are connected to an outlet of the pressure pump 66 via an air supply channel 71. The control device C drives the pump motor 65 to pump the pressure pump 66, whereby pressurized air emitted from the pressure pump 66 is supplied to the ink cartridges IC1 to IC8 via the air supply channel 71.

In the main-body casing 12, an electromagnetic lock 68 for locking the cover 38 in a closed state indicated by a solid line in FIG. 2 is provided at a position aligned with a pivot end of the cover 38 in the closed state. For example, an operable switch 72 (see FIG. 3) to be operated by the user for locking and unlocking the cover 38 is provided near the cover 38 in the main-body casing 12. When the control device C receives a lock signal in response to user's operation of the operable switch 72 for locking the cover 38, the control device C magnetizes the electromagnetic lock 68 so as to lock the cover 38 in the closed state. In contrast, when the control device C receives an unlock signal in response to user's operation of the operable switch 72 for unlocking the cover 38, the control device C demagnetizes the electromagnetic lock 68 so as to unlock the cover 38. Referring to FIG. 2, if cartridge replacement is to be performed, at least one of the ink cartridges IC1 to IC8 is replaced while the cover 38 is set in an open state indicated by a two-dot chain line (although the maximum degree of opening of the cover 38 is actually larger than the state shown in FIG. 2). After setting the cover 38 back to the closed state indicated by the solid line in FIG. 2, the cover 38 is locked in the closed state by operating the operable switch 72. The method for inputting a cover lock command is not limited to the above-described method in which the command is input by operating the operable switch 72. For example, the electromagnetic lock 68 may be magnetized when the control device C receives a closed-state detection signal from a sensor that detects that the cover 38 is in a closed state.

Figure 3:
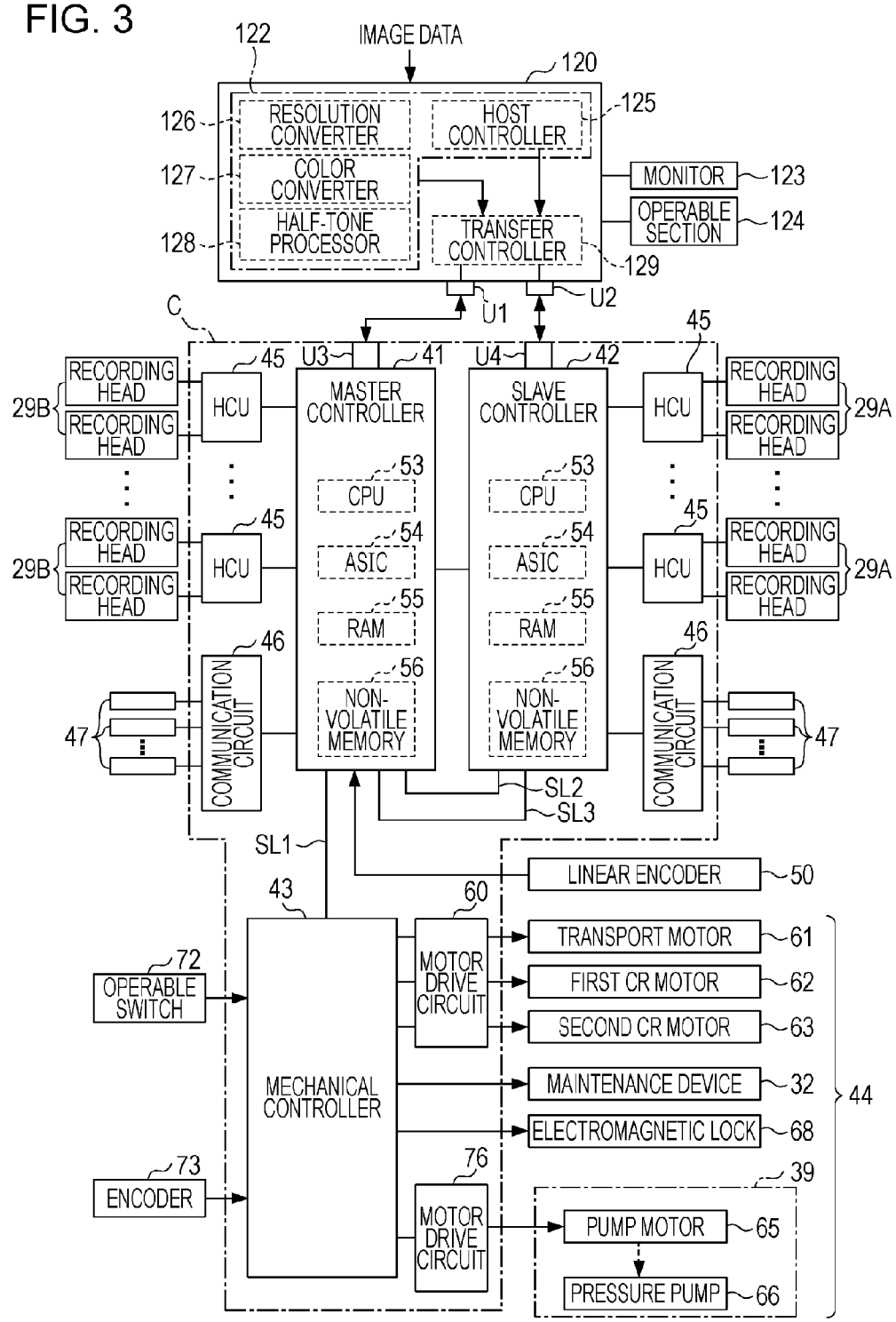
FIG. 3 is a block diagram illustrating an electrical configuration of the printing system.

FIG. 3 is a block diagram illustrating an electrical configuration of the printing system 100. The printer driver 122 in the host apparatus (output control apparatus) 120 shown in FIG. 3 includes a host controller 125 that performs display control of various screens, including the menu screen, a print-condition setting screen, and the error screen, to be displayed on the monitor (display) 123 serving as an output unit, and that also performs predetermined processing in accordance with an operation signal input from the operable section 124 in the displayed state of each screen. The host controller 125 performs overall control of the printer driver 122. The printer driver 122 includes a resolution converter 126, a color converter 127, and a half-tone processor 128 that perform image processing required for generating print data corresponding to image data received from the higher-level image generating apparatus 110. The resolution converter 126 performs resolution conversion processing for converting the image data from display resolution to print resolution. The color converter 127 performs color conversion processing for converting the image data from a display color system (e.g., RGB color system or YCbCr color system) to a print color system (e.g., CMYK color system). The half-tone processor 128 performs half-tone processing for converting high gradation (e.g., 256 gradation) pixel data for display to low gradation (e.g., 2 or 4 gradation) pixel data for printing. The printer driver 122 adds a command written in a print control code (e.g., Epson Standard Code for Printer (ESC/P)) to the print image data generated as a result of the aforementioned image processing so as to generate print job data (sometimes simply referred to as "print data" hereinafter).

The host apparatus 120 includes a transfer controller 129 that performs data transfer control. The transfer controller 129 serially transfers the print data generated in the printer driver 122 to the control device C by a predetermined volume of packet data. Therefore, in this embodiment, the host apparatus 120 and the control device C constitute an image processing system.

The control device C in the printer 11 includes a pair of controllers (information processing devices) 41 and 42 that receive the print data from the host apparatus 120 and perform various kinds of control, including control of a recording system. The controllers 41 and 42 share the burden of controlling the multiple (15 in this embodiment) recording heads 29 by dividing the recording heads 29 into two groups having predetermined numbers (seven and eight in this embodiment) of recording heads 29. Specifically, the master controller 41 (first information processing device) is in charge of controlling seven recording heads (first print heads) 29B, and the slave controller 42 (second information processing device) is in charge of controlling eight recording heads (second print heads) 29A. In this embodiment, the recording heads 29B serve as managed sections to be managed by the master controller 41, and the recording heads 29A serve as managed sections to be managed by the slave controller 42.

The 15 recording heads 29 provided in the carriage 27 shown in FIG. 2 are disposed in a zigzag pattern in which the two rows of the recording heads 29A and 29B arranged in the sub scanning direction Y are deviated from each other by half a pitch in the sub scanning direction Y. The controllers 41 and 42 shown in FIG. 3 share the burden of respectively controlling the two rows of the recording heads 29B and 29A.

The control device C further includes a mechanical controller (drive control device) 43 that is connected to the output side (i.e., the downstream side in the control direction) of the master controller 41 via a communication line SL1. The mechanical controller 43 controls a mechanical mechanism 44 mainly including a transport system and a carriage drive system. The master controller 41 sends a carriage start command to the mechanical controller 43 when the seven recording heads 29B managed by the master controller 41 and the eight recording heads 29A managed by the slave controller 42 are ready for printing (i.e., when print image data to be used for controlling the ejection of ink droplets is ready). This prevents the occurrence of an ejection error in which ink droplets are not ejected even when the recording heads 29 have reached the ejection position, which can occur when the carriage 27 is started before one of the controllers 41 and 42 is completely ready for printing.

The master controller 41 sends a transport command for commanding transport of the sheet 13 to the mechanical controller 43 when the seven recording heads 29B managed by the master controller 41 and the eight recording heads 29A managed by the slave controller 42 have completed the printing process. This prevents deviation of landing positions of the ink droplets ejected from the recording heads 29 onto the sheet 13 (i.e., print position deviation), which can occur when the transport of the sheet 13 is commenced (or the sheet 13 attached on the support member 19 is released therefrom) before one of the controllers 41 and 42 completes the printing process. Accordingly, the master controller 41 has a function of sending a command in synchronization with the progress of the slave controller 42. For synchronization of control, the two controllers 41 and 42 are divided into a slave side that outputs a command to the other controller and a master side that outputs a command to the mechanical controller 43 at a point when its own command and the command received from the slave controller are ready and the content of the commands are confirmed as being identical to each other. In this embodiment, even if the master side and the slave side have differences in terms of mechanisms for synchronization of control, the master controller 41 and the slave controller 42 are configured by the same program. This feature will be described later.

The printer driver 122 in the host apparatus 120 shown in FIG. 3 divides the print image data into two data items in accordance with the disposed positions of the recording heads 29 correspondingly managed by the two controllers 41 and 42, and adds the same command to the two print image data items so as to generate two pieces of print data.

As shown in FIG. 3, the host apparatus 120 includes two serial communication ports U1 and U2. The two controllers 41 and 42 also include serial communication ports U3 and U4, respectively. The transfer controller 129 serially transfers the corresponding print data to the master controller 41 via communication between the serial communication ports U1 and U3, and also serially transfers the corresponding print data to the slave controller 42 via communication between the serial communication ports U2 and U4. In this embodiment, for example, Universal Serial Bus (USB) ports are used as the serial communication ports U1 to U4. The host apparatus 120 can transfer the print data to the controllers 41 and 42 at a relatively high speed by performing a serial transfer with two lines using two USB hosts constituting the two serial communication ports U1 and U2.

The two controllers 41 and 42 are each connected to N (four in this example) head control units (HCUs) 45. Each HCU 45 is connected to M (two in this example) recording heads 29.

Communication circuits 46 connected to the two controllers 41 and 42 are each connected to half, i.e., four, of the eight memory cells 47 mounted to the eight ink cartridges IC1 to IC8. The master controller 41 is communicable with the memory cells 47 mounted to the four ink cartridges IC1 to IC4, and the slave controller 42 is communicable with the memory cells 47 mounted to the four ink cartridges IC5 to IC8. The memory cells 47 each store various kinds of ink-related information, including information regarding the amount of remaining ink in the corresponding ink cartridge IC, the color of the ink, the expiration date, maintenance information, and the product number.

The master controller 41 manages the amount of remaining ink in each of the four ink cartridges IC1 to IC4. The slave controller 42 manages the amount of remaining ink in each of the remaining four ink cartridges IC5 to IC8. The master controller 41 communicates with the memory cells 47 of the ink cartridges IC1 to IC4 via the corresponding communication circuit 46 so as to be capable of reading the ink information and the remaining-ink information stored in the memory cells 47 and writing the remaining-ink information. Similarly, the slave controller 42 communicates with the memory cells 47 of the ink cartridges IC5 to IC8 via the corresponding communication circuit 46 so as to be capable of reading the ink information and the remaining-ink information stored in the memory cells 47 and writing the remaining-ink information. Specifically, in this embodiment, the ink cartridges IC1 to IC4 serve as managed sections to be managed by the master controller 41, and the ink cartridges IC5 to IC8 serve as managed sections to be managed by the slave controller 42.

The controllers 41 and 42 read the amount of remaining ink from the memory cells 47 when the printer 11 is activated, calculate the amount of ink consumed by the corresponding ink cartridges at a predetermined time point, and sequentially calculate the current amount of ink remaining in the ink cartridges. For example, when the printer 11 is shut off, the controllers 41 and 42 write the current remaining-ink information into the memory cells 47. For example, the host apparatus 120 communicates with the controllers 41 and 42 in the printer 11 so as to obtain the remaining-ink information, and displays the remaining amount of the inks in the ink cartridges IC1 to IC8 on the monitor 123 (see FIG. 1).

The two controllers 41 and 42 share the burden of controlling or managing the plurality of recording heads 29 and ink cartridges IC1 to IC8 provided in the printer 11 so as to reduce the load.

As shown in FIG. 3, the master controller 41 is connected to a linear encoder 50. The linear encoder 50 is provided along a movement path of the carriage 27. The linear encoder 50 inputs a detection signal (encoder pulse signal), whose number of pulses is proportional to a movement distance of the carriage 27, to the master controller 41. The encoder pulse signal input to the master controller 41 is transmitted to the slave controller 42 via a signal line SL2 connected between the controllers 41 and 42. Furthermore, the master controller 41 and the slave controller 42 are connected to each other via a communication line SL3.

The controllers 41 and 42 each include a central processing unit (CPU) 53, an application specific integrated circuit (ASIC) 54, a random access memory (RAM) 55, and a nonvolatile memory 56. The CPU 53 executes a program stored in the nonvolatile memory 56 so as to perform various tasks required for print control. The ASIC 54 performs data processing or the like of a recording system, such as processing of the print data. The ASIC 54 also counts the number of dots corresponding to the number of times ink droplets are to be ejected from the recording heads 29 for the individual colors on the basis of the print image data and adds the number of dots for each color together for each of the recording heads 29 so as to calculate an amount of ink consumption for the corresponding color. In this case, the ASIC 54 in the master controller 41 calculates the amount of ink consumption by the seven recording heads 29B for the individual colors, and the ASIC 54 in the slave controller 42 calculates the amount of ink consumption by the eight recording heads 29A for the individual colors.

Of the amount of the eight color inks consumed by the seven recording heads 29B, the master controller 41 sends the amount of consumption of four color inks, to be stored in the memory cells 47 connected to the slave side, to the slave controller 42. On the other hand, of the amount of the eight color inks consumed by the eight recording heads 29A, the slave controller 42 sends the amount of consumption of four color inks, to be stored in the memory cells 47 connected to the master side, to the master controller 41. Each of the controllers 41 and 42 adds the unsent amount of consumption of the four color inks calculated by its own ASIC 54 to the amount of consumption of the same four color inks received from the other controller together on a color-by-color basis so as to obtain the amount of ink consumption in each of the four ink cartridges IC that the controller manages. Then, the obtained amount of ink consumption is subtracted from the amount of remaining ink stored in the corresponding memory cells 47 so as to acquire the amount of remaining ink at any given time for each color.

For example, when a request for remaining-ink information is received from the printer driver 122 of the host apparatus 120, each of the controllers 41 and 42 sends the remaining amount of the four color inks that the controller manages to the other controller. Then, each of the controllers 41 and 42 sends remaining-ink information corresponding to the eight colors, which includes the remaining amount of the four color inks received from the other controller and the remaining amount of the four color inks that the controller manages, to the printer driver 122 of the host apparatus 120. The printer driver 122 receives the remaining-ink information corresponding to the eight colors from both the controllers 41 and 42, and causes the monitor 123 to display a print-condition setting screen including an indicator indicating the remaining amount of the eight color inks on the basis of the remaining-ink information corresponding to the eight colors received from one of the two controllers (e.g., the master side).

The mechanical controller 43 is connected to the transport motor 61, the first CR motor 62, and the second CR motor 63, which constitute the mechanical mechanism 44, via a motor drive circuit 60. The mechanical controller 43 is also connected to the maintenance device 32 and the electromagnetic lock 68. Moreover, the mechanical controller 43 is connected to the pump motor 65, which constitutes the ink supply device 39, via a motor drive circuit 76. The pressure pump 66 is driven by driving the pump motor 65.

The mechanical controller 43 is connected to an encoder 73 and the aforementioned operable switch 72 serving as an input system. The mechanical controller 43 magnetizes the electromagnetic lock 68 in response to a lock signal input from the operable switch 72 or demagnetizes the electromagnetic lock 68 in response to an unlock signal input from the operable switch 72. After the mechanical controller 43 magnetizes the electromagnetic lock 68 to lock the cover 38, the mechanical controller 43 outputs normal-state information indicating that the cover 38 is locked to the master controller 41. On the other hand, if printing is commenced in a state where the cover 38 is not closed or if the cover 38 is opened during the printing process, the mechanical controller 43 outputs error occurrence information indicating that the cover 38 is open to the master controller 41.

The mechanical controller 43 controls driving of the motors 61 to 63 and 65, the maintenance device 32, and the electromagnetic lock 68, that is, the mechanical mechanism 44, in accordance with various commands received from the master controller 41 via the communication line SL1.

During the printing process, the control device C performs a transport operation for transporting the sheet 13 by driving the transport motor 61 so as to set a next print region of the sheet 13 onto the support member 19, a suction operation for attaching the aforementioned print region of the transported sheet 13 to the support member 19 by suction, a printing operation for performing printing on the sheet 13 by using the recording heads 29, and a suction-releasing operation for releasing the suction force applied to the sheet 13 upon completion of one printing process (i.e., after one page is printed). In this case, the printing operation is performed by ejecting ink droplets from the recording heads 29 while moving the carriage 27 in the main scanning direction X. Specifically, in the printing operation, a process of moving the carriage 27 in the main scanning direction X (for one pass) by driving the CR motors 62 and 63 and a process of moving the carriage 27 in the sub scanning direction Y every time one pass is completed are repeated for a predetermined number of times.

Figure 4:
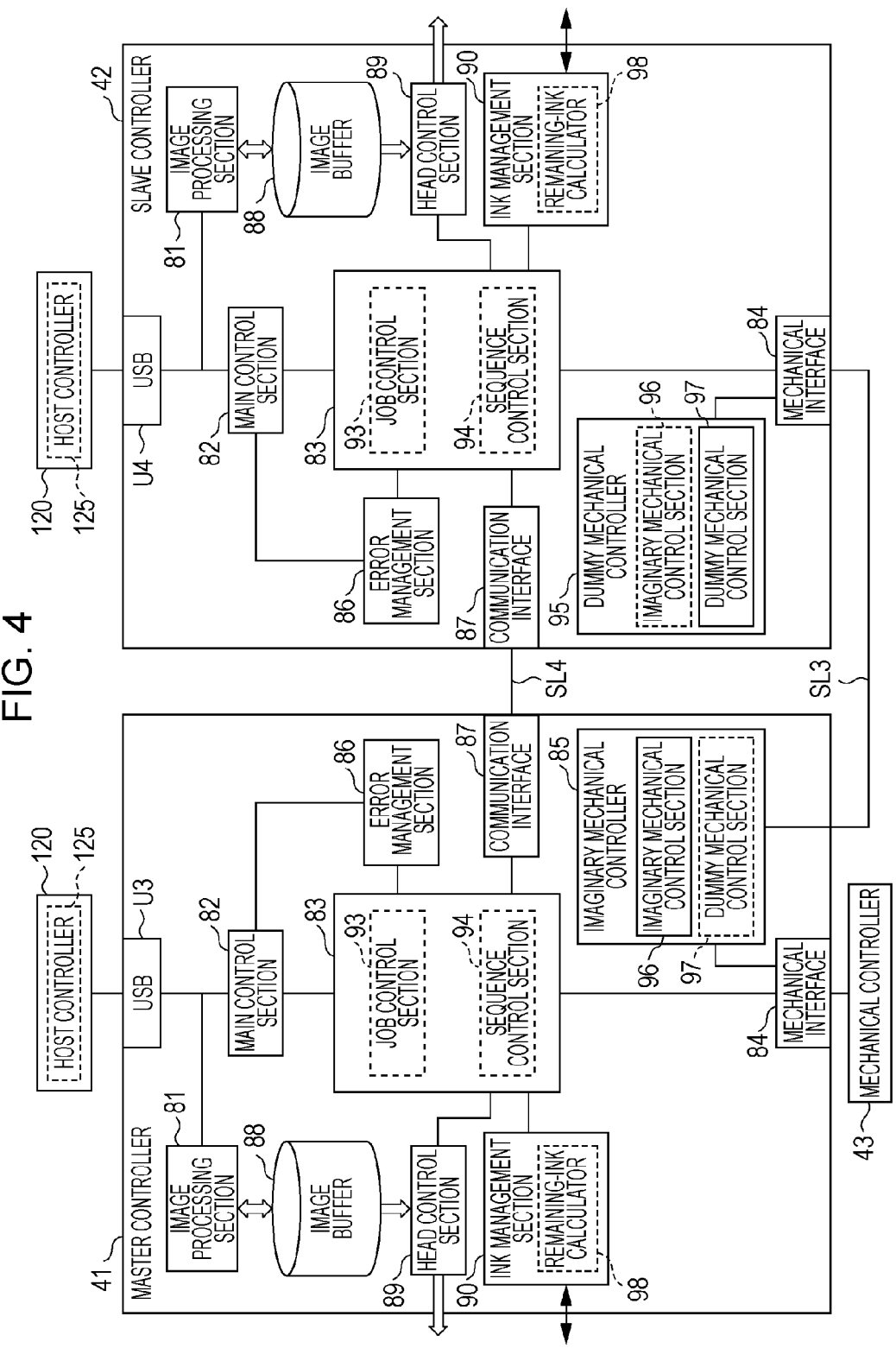
FIG. 4 is a block diagram illustrating the configuration of master and slave controllers.

FIG. 4 is a block diagram for explaining a functional configuration of the master controller 41 and the slave controller 42. As shown in FIG. 4, the controllers 41 and 42 have symmetrical configurations. Due to the symmetrical configurations (substantially identical functional configurations), the following description includes a description of the configuration of the master controller 41 and a description of parts of the slave controller 42 that are different therefrom.

The master controller 41 includes the serial communication port U3, an image processing section 81, a main control section 82, a mechanical control section 83, a mechanical interface 84 as an example of a communication unit, and an imaginary mechanical controller 85. The master controller 41 further includes an error management section 86, a communication interface 87, an image buffer 88, a head control section 89, and an ink management section 90. On the other hand, the slave controller 42 only differs from the master controller 41 in that it includes a dummy mechanical controller 95, as an example of an imaginary drive control unit, in place of the imaginary mechanical controller 85. The remaining configuration of the slave controller 42 is the same as that of the master controller 41. The main control section 82 has a function of controlling the overall operation of the sections 83 to 90.

The mechanical interface 84 of the slave controller 42 is connected to the imaginary mechanical controller 85 of the master controller 41 via the communication line SL3. Specifically, in contrast to the mechanical interface 84 of the master controller 41 being connected to the actual mechanical controller 43, the mechanical interface 84 of the slave controller 42 is connected to the imaginary mechanical controller 85 provided in the master controller 41. In other words, the mechanical interface 84 at the slave side actually sends a command to the imaginary mechanical controller 85 as if sending the command to the mechanical controller 43.

In the master controller 41 shown in FIG. 4, the serial communication port U3 receives print data from the printer driver 122 (see FIGS. 1 and 3) of the host apparatus 120. The image processing section 81 at the master side performs image processing, such as decompression of the print data, a command analysis, micro-weave processing, and vertical-horizontal conversion. Likewise, in the slave controller 42 shown in FIG. 4, the serial communication port U4 receives the print data from the printer driver 122 (see FIGS. 1 and 3) of the host apparatus 120. The image processing section 81 at the slave side performs image processing, such as decompression of the print data, a command analysis, microwave processing, and vertical-horizontal conversion.

The image processing section 81 in the master controller 41 temporarily stores the decompressed print data in the image buffer 88 and performs a command analysis on the print data read from the image buffer 88. The print data includes print image data and a print language command. The image processing section 81 analyzes the print language command in the decompressed print data so as to acquire a command, and then sends the acquired command to the mechanical control section 83. The image processing section 81 sequentially performs required image processing on the print image data, such as allocation processing (micro-weave processing) for allocating the dots to the nozzles and vertical-horizontal conversion, so as to generate head control data to be used for controlling the recording heads 29, and then stores the head control data in the image buffer 88.

The head control section 89 reads the head control data from the image buffer 88, divides the head control data into head control data items for the respective recording heads 29, and then transfers the data items while allocating the data items to the respective HCUs 45. Furthermore, the HCUs 45 serially sends the head control data items to the corresponding recording heads 29. A head drive circuit (not shown) in each recording head 29 controls driving of an ejection drive element in each nozzle 36 on the basis of the head control data and causes the nozzle 36 to eject ink droplets. In this case, the head control section 89 generates an ejection timing signal on the basis of the encoder pulse signal input from the linear encoder 50, and the head drive circuit drives each ejection drive element on the basis of the ejection timing signal.

In this embodiment, if an error, such as an ink ejection defect, is detected in the recording heads 29 that the head control section 89 manages, the head control section 89 outputs an error code indicating the content of the error and an error occurrence location (in this case, any one or more of the recording heads 29) to the mechanical control section 83.

The mechanical control section 83 sends the command received from the image processing section 81 to the mechanical interface 84. In this case, the mechanical control section 83 monitors, for example, the progress of processing performed in the head control section 89 and sends the command to the mechanical interface 84 when head control data to be used for a subsequent pass is received and the printing process is ready.

When the mechanical interface 84 receives the command from the mechanical control section 83, the mechanical interface 84 makes an inquiry to the imaginary mechanical controller 85. Then, when the mechanical interface 84 receives an Ack signal (positive signal) from the imaginary mechanical controller 85 as a response to the inquiry, the mechanical interface 84 sends the command to the mechanical controller 43. Specifically, if the mechanical interface 84 does not receive the Ack signal from the imaginary mechanical controller 85 as a response to the inquiry, the mechanical interface 84 waits until receiving the Ack signal. When the Ack signal is received, the mechanical interface 84 sends the command to the mechanical controller 43. However, in the case of a time-out as a result of the waiting period reaching a preset time period, the mechanical interface 84 sends a time-out notification to the main control section 82 via the mechanical control section 83.

Likewise, in the slave controller 42, the image processing section 81, the mechanical control section 83, and the mechanical interface 84 perform the same processing. However, the dummy mechanical controller 95 has a function different from that of the imaginary mechanical controller 85. Specifically, when the dummy mechanical controller 95 receives an inquiry from the mechanical interface 84, the dummy mechanical controller 95 unconditionally and immediately sends an Ack signal to the mechanical interface 84. Therefore, when the mechanical interface 84 in the slave controller 42 receives a command from the mechanical control section 83 and makes an inquiry, the mechanical interface 84 immediately receives the Ack signal from the dummy mechanical controller 95, so that the mechanical interface 84 can output the command substantially without any waiting period after receiving the command.

In contrast, when the imaginary mechanical controller 85 in the master controller 41 receives an inquiry from the mechanical interface 84, the imaginary mechanical controller 85 sends the Ack signal to the mechanical interface 84 on the basis of a condition in which the command sent via the communication line SL3 is received via an input port (i.e., an input port different from the serial communication port U3) serving as an input terminal connected to the communication line SL3. Therefore, the mechanical interface 84 in the master controller 41 waits until the command is received by both mechanical interfaces 84 at the master side and the slave side, and outputs the command to the mechanical controller 43 after both the master side and the slave side have received the command. Consequently, the command can be sent to the mechanical controller 43 synchronously from the master controller 41 and the slave controller 42.

As shown in FIG. 4, the imaginary mechanical controller 85 and the dummy mechanical controller 95 have the same configuration, and each include an imaginary mechanical control section 96 and a dummy mechanical control section 97. When the imaginary mechanical control section 96 is activated, the imaginary mechanical control section 96 functions as the imaginary mechanical controller 85. When the dummy mechanical control section 97 is activated, the dummy mechanical control section 97 functions as the dummy mechanical controller 95. Whether to activate the imaginary mechanical control section 96 or the dummy mechanical control section 97 is determined on the basis of whether the corresponding main control section 82 is set to act as the master side or the slave side. If the main control section 82 is set to act as the master side, the corresponding imaginary mechanical control section 96 is enabled and activated, whereas the corresponding dummy mechanical control section 97 is disabled and not activated. On the other hand, if the main control section 82 is set to act as the slave side, the corresponding dummy mechanical control section 97 is enabled and activated, whereas the corresponding imaginary mechanical control section 96 is disabled and not activated.

The mechanical interface 84 in the master controller 41 shown in FIG. 4 receives error occurrence information from the mechanical controller 43 when an error occurs in the mechanical controller 43. When the mechanical interface 84 receives the error occurrence information, the mechanical interface 84 sends the error occurrence information to the imaginary mechanical controller 85. When the mechanical interface 84 receives the Ack signal (positive signal) as a response from the imaginary mechanical controller 85, the mechanical interface 84 also sends the error occurrence information to the higher-level mechanical control section 83.

The communication interfaces 87 are provided for synchronizing the processing and for performing communication for exchanging information between the head control sections 89 and the ink management sections 90 at the master side and the slave side.

Each ink management section 90 acquires the amount of the eight color inks consumed by about half of the recording heads 29A (or 29B) from an ink-consumption calculator (not shown) within the ASIC 54. Then, the ink management section 90 sends ink-consumption information corresponding to four colors managed by the other controller to the ink management section 90 of the other controller via the mechanical control section 83 and the communication interface 87 at a predetermined time point, such as when a request for remaining-ink information is received from the printer driver 122 of the host apparatus 120, when one printing process is completed, or when the power is turned off. Furthermore, the ink management section 90 includes a remaining-ink calculator 98 that adds the received amount of ink consumption corresponding to the four colors and the amount of ink consumption corresponding to the four colors that the ink management section 90 manages for the individual colors so as to calculate the amount of the four color inks consumed by all of the recording heads 29. Furthermore, the remaining-ink calculator 98 subtracts the calculated amount of ink consumption corresponding to the four colors from the previous amount of remaining ink so as to calculate a current amount of remaining ink. The current remaining-ink information is temporarily stored in a predetermined storage area of the RAM 55. The current amount of remaining ink read from the RAM 55 by the ink management section 90 is written into the nonvolatile memory 56 and is also written into the corresponding memory cells 47 at a predetermined time point, such as when the power is turned off.

When the request for the remaining-ink information is received from the printer driver 122, the ink management section 90 sends the current amount of remaining ink stored in the RAM 55 to the ink management section 90 in the other controller. Then, the ink management section 90 sends remaining-ink information corresponding to all of the eight colors, including the four colors that the ink management section 90 manages and the four colors managed by the other ink management section 90, to the printer driver 122 via the serial communication port U3 (or U4). In this case, the printer driver 122 receives the remaining-ink information corresponding to the eight colors (the same information) from the master controller 41 and the slave controller 42, and displays the remaining amount of ink on the monitor 123 using one of two pieces of remaining-ink information received via different communication paths. However, if the two pieces of remaining-ink information differ from each other, the remaining-ink information received from the master controller 41 is used.

In this embodiment, each ink management section 90 determines whether or not the amount of ink remaining in each of the ink cartridges IC that the ink management section 90 manages is smaller than or equal to a predetermined lower limit value. This lower limit value is a reference value used for determining whether or not to urge the user to replace the ink cartridge IC. If the ink management section 90 detects that the amount of ink remaining in any of the ink cartridges IC is smaller than or equal to the lower limit value, the ink management section 90 outputs an error code indicating the detection result and information regarding the ink cartridge IC in which the error has occurred to the mechanical control section 83.

Furthermore, the ink management section 90 also checks for appropriateness of the corresponding ink cartridges IC, for example, during first initialization when the printer 11 is activated or immediately after an ink cartridge IC has been replaced. Then, if the ink management section 90 detects an inappropriate ink cartridge, the ink management section 90 sends an error code indicating the detection result to the mechanical control section 83. An inappropriate ink cartridge in this case is not an unusable cartridge, such as an empty ink cartridge, but is an ink cartridge that can be used for printing but not appropriate for ensuring satisfactory print quality. For example, the term "inappropriate ink cartridge" includes an expired ink cartridge.

The mechanical control section 83 includes a job control section 93 that controls the order in which commands are to be executed, and a sequence control section 94 that performs sequence control by outputting the commands in the order controlled by the job control section 93. If the mechanical control section 83 receives error occurrence information and an error code from the mechanical interface 84, the head control section 89, and the ink management section 90, the mechanical control section 83 transfers the error occurrence information and the error code to the error management section 86.

The error management section 86 generates an error command on the basis of the input error code and the input error occurrence information, and outputs the error command to the main control section 82. The main control section 82 having received the error command transfers the error command toward the host apparatus 120 via the serial communication port U3 (or U4). Accordingly, in this embodiment, the error management section 86 also functions as a command generating unit.

Next, an error detection routine executed by each error management section 86 in this embodiment will be described with reference to a flow chart shown in FIG. 5 and schematic diagrams shown in FIGS. 7A and 7B. This error detection routine is executed for generating an error command and outputting the generated error command to the main control section 82.

When the error management section 86 receives an error code and error occurrence information, the error management section 86 executes the error detection routine. In step S100, if the error code is input from the mechanical interface 84, the head control section 89, and the ink management section 90 via the mechanical control section 83, the error management section 86 identifies the location where the error has occurred. Specifically, information regarding the error occurrence location is input from the mechanical interface 84, the head control section 89, and the ink management section 90 together with the error code. Therefore, the error management section 86 identifies the location where the error has occurred on the basis of the input information regarding the error occurrence location, and sets a parameter corresponding to the location.

Furthermore, when the error management section 86 receives error occurrence information, specifically, when an error is detected in the mechanical controller 43 or when an error is detected in the mechanical mechanism 44, the error management section 86 analyzes the error occurrence information and acquires the content of the error and the location where the error has occurred. Then, the error management section 86 acquires an error code according to the acquired content of the error and a parameter corresponding to the error occurrence location.

The parameter includes values that are different among the individual components constituting the printer 11. For example, a parameter corresponding to the master controller 41 differs from a parameter corresponding to the slave controller 42. Moreover, a parameter corresponding to the lower-left recording head 29 (29A) in FIG. 2 differs from a parameter corresponding to the neighboring recording head 29 (29A). Likewise, a parameter corresponding to the ink cartridge IC that contains black ink differs from a parameter corresponding to the ink cartridge IC that contains cyan ink.

In step S110, the error management section 86 acquires an output format (see FIGS. 7A and 7B) for generating an error command. The output format is prepared for each error code. In step S120, the error management section 86 sets the error code and the parameter to the acquired output format so as to generate an error command. In step S130, the error management section 86 outputs the generated error command to the main control section 82 and ends the error detection routine. The main control section 82 having received the error command transfers the error command toward the host apparatus 120 via the serial communication port U3 (or U4).

An output format corresponding to a case where the amount of ink remaining in one of the ink cartridges IC is smaller than or equal to the lower limit value will be described below as an example of an output format with reference to FIGS. 7A and 7B. FIG. 7A illustrates an example of an output format in the master controller 41. FIG. 7B illustrates an example of an output format in the slave controller 42.

As shown in FIGS. 7A and 7B, each output format has a first segment F11 or F21 located at the highest level, a second segment F12 or F22 located below (on the right side of, in FIGS. 7A and 7B) the first segment F11 or F21, and a third segment F13 or F23 located below (on the right side of, in FIGS. 7A and 7B) the second segment F12 or F22. Each of the first segments F11 and F21 is an area where an error code is set. For example, if the error code input to the error management section 86 is "6106 (hexadecimal digit)", "6106 (hexadecimal digit)" is set in the first segment F11.

Each of the second segments F12 and F22 is an area where a value obtained by adding "1" to the number of managed sections to be managed by the controller 41 or 42 (in this case, the number of ink cartridges IC). Because the controllers 41 and 42 each manage four ink cartridges IC in this embodiment, "5 (hexadecimal digit)" is set in each of the second segments F12 and F22.

Each of the third segments F13 and F23 is an area where a parameter based on an error occurrence location is set in correspondence with identification codes. For example, a first code C11 including an identification code S11 (e.g., 18 (hexadecimal digit)) corresponding to the ink cartridge IC1 of the four ink cartridges IC1 to IC4 and a correspondence value D(18) corresponding to the identification code S11 is set at the highest level of the third segment F13 of the output format shown in FIG. 7A. The correspondence value D(18) is a value (e.g., 1 (hexadecimal digit)) corresponding to the ink cartridge IC1 if the amount of ink remaining in the ink cartridge IC1 is smaller than or equal to the lower limit value, but is null data if the remaining amount of ink is greater than the lower limit value.

A second code C12 including an identification code S12 (e.g., 19 (hexadecimal digit)) corresponding to the ink cartridge IC2 and a correspondence value D(19) corresponding to the identification code S12 is set below the first code C11 in the third segment F13. The correspondence value D(19) is a value (e.g., 2 (hexadecimal digit)) corresponding to the ink cartridge IC2 if the amount of ink remaining in the ink cartridge IC2 is smaller than or equal to the lower limit value, but is null data if the remaining amount of ink is greater than the lower limit value.

A third code C13 including an identification code S13 (e.g., 1A (hexadecimal digit)) corresponding to the ink cartridge IC3 and a correspondence value D(1A) corresponding to the identification code S13 is set below the second code C12 in the third segment F13. A fourth code C14 including an identification code S14 (e.g., 1B (hexadecimal digit)) corresponding to the ink cartridge IC4 and a correspondence value D(1B) corresponding to the identification code S14 is set below the third code C13 in the third segment F13. A fifth code (also called "special code") C15 including an identification code S15 (e.g., FF (hexadecimal digit)) related to the output mode at the host apparatus 120 and a correspondence value D(FF) corresponding to the identification code S15 is set at the lowest level of the third segment F13. The identification codes S11 to S15 have different values set therein.

If the error management section 86 determines that it is necessary to display a character string corresponding to the identification code S15 on the monitor 123, a freely-chosen value (e.g., 5 (hexadecimal digit)) other than null data is set as the correspondence value D(FF) corresponding to the identification code S15.

The third segment F23 in the output format shown in FIG. 7B includes a first code C21, a second code C22, a third code C23, a fourth code C24, and a fifth code (also called "special code") C25 set in that order from the highest level toward the lowest level. The first code C21 is a code for the ink cartridge IC5 and includes an identification code S21 (e.g., 11 (hexadecimal digit)) and a correspondence value D(11) corresponding to the identification code S21. The second code C22 is a code for the ink cartridge IC6 and includes an identification code S22 (e.g., 12 (hexadecimal digit)) and a correspondence value D(12) corresponding to the identification code S22. The third code C23 is a code for the ink cartridge IC7 and includes an identification code S23 (e.g., 13 (hexadecimal digit)) and a correspondence value D(13) corresponding to the identification code S23. The fourth code C24 is a code for the ink cartridge IC8 and includes an identification code S24 (e.g., 14 (hexadecimal digit)) and a correspondence value D(14) corresponding to the identification code S24. The special code C25 is a code related to the output mode at the host apparatus 120 and includes an identification code S25 (e.g., FF (hexadecimal digit)) and a correspondence value D(FF) corresponding to the identification code S25.

The identification codes S21 to S24 are values different from those of the identification codes S11 to S14. The identification code S25 is the same value as the identification code S15. If the error management section 86 determines that it is necessary to display a character string corresponding to the identification code S25 on the monitor 123, a freely-chosen value other than "0 (hexadecimal digit)" is set as the correspondence value D(FF) corresponding to the identification code S25.

Next, the host controller 125 acting as an error-command transfer destination will be described with reference to FIGS. 6 to 9 while mainly focusing on functional components that function when an error command is transferred from the printer 11.

As shown in FIG. 6, the host controller 125 includes a command analyzing section 130, an integrating section 131, a first memory 132, a second memory 133, and a display control section 134.

The command analyzing section 130 analyzes error commands transferred from the controllers 41 and 42. For example, the command analyzing section 130 has a storage portion (not shown) that stores the error commands from the controllers 41 and 42. If the command analyzing section 130 determines that it is not necessary to display error information based on the error commands on the monitor 123, the command analyzing section 130 deletes the error commands from the storage portion.

When an error command is transferred from the controller 41 or 42, the command analyzing section 130 determines whether or not there is an error command that is exactly identical to the new transported error command among error commands stored in the storage portion. If there is already an error command that is exactly identical to the new transported error command in the storage portion, the command analyzing section 130 determines that it is not necessary to make the monitor 123 display error information based on the new error command, and does not output the new error command to the display control section 134. Therefore, in this embodiment, the command analyzing section 130 also functions as a command determination unit.

If there are no error commands stored in the storage portion that are exactly identical to the aforementioned new error command, the command analyzing section 130 determines whether or not an error command including an error code that is identical to the error code included in the new error command is stored in the storage portion. Then, if an error command including an error code that is identical to the error code included in the new error command is stored in the storage portion, the command analyzing section 130 outputs the error command and the new error command to the integrating section 131. On the other hand, if such an error command including an error code that is identical to the error code included in the new error command is not stored in the storage portion, the command analyzing section 130 stores the new error command into the storage portion and outputs the new error command to the display control section 134. Therefore, in this embodiment, the command analyzing section 130 also functions as a code determination unit.

If error commands are transferred from the controllers 41 and 42 at substantially the same timing, the command analyzing section 130 determines whether or not the error command (referred to as "first error command" hereinafter) from the master controller 41 and the error command (referred to as "second error command" hereinafter) from the slave controller 42 are exactly identical to each other. If the error commands are exactly identical, the command analyzing section 130 only outputs the first error command to the display control section 134.

If the error commands are not identical, the command analyzing section 130 determines whether or not an error code (referred to as "first error code" hereinafter) included in the first error command and an error code (referred to as "second error code" hereinafter) included in the second error command are identical to each other. If the first error code and the second error code are not identical, the command analyzing section 130 stores the first error command and the second error command into the storage portion and outputs the error commands to the display control section 134. If the first error code and the second error code are identical, the command analyzing section 130 outputs the first error command and the second error command to the integrating section 131.

The integrating section 131 performs integration processing (also called "merge processing") on the input error commands so as to generate an integrated command, and outputs the integrated command to the display control section 134. Therefore, in this embodiment, the integrating section 131 functions as an integrating unit. For example, the integrating section 131 generates an integrated command shown in FIG. 7C on the basis of the first error command shown in FIG. 7A and the second error command shown in FIG. 7B. This integrated command has a first segment F31 located at the highest level, a second segment F32 located below the first segment F31, and a third segment F33 located below the second segment F32. In the first segment F31, a common error code (e.g., 6106 (hexadecimal digit)) included in the first error command and the second error command is set.

In the second segment F32, a value obtained by adding "1" to the total number of managed sections to be managed by the controllers 41 and 42 (in this case, the total number of ink cartridges IC) is set. Since there are a total of eight ink cartridges IC in this embodiment, "9 (hexadecimal digit)" is set in the second segment F32.

In the third segment F33, a parameter based on an error occurrence location is set in correspondence with identification codes. Specifically, the third segment F33 is constituted of codes C11 to C15 included in the first error command and codes C21 to C25 included in the second error command. For example, among the codes C11 to C15 and the codes C21 to C25, a code having an identification code with the smallest numerical value is located at the highest level, and a code having an identification code with the largest numerical value is located at the lowest level. In this case, the codes are arranged in the following order: the first code C21, the second code C22, the third code C23, the fourth code C24, the first code C11, the second code C12, the third code C13, and the fourth code C14. The identification code S15 of the special code C15 is identical to the identification code S25 of the fifth code C25. Therefore, a special code C35 including an identification code S35 with the same value as the identification codes S15 and S25 and a sum value (D(FF)) of the correspondence values D(FF) of the special codes C15 and C25 is set at the lowest level of the third segment F33.

The first memory 132 stores a table T1 shown in FIG. 8. The table T1 shows the correspondence relationship between error codes and error messages to be displayed in a first display region 141 (see FIG. 10) of the monitor 123. As shown in FIG. 8, an error message corresponding to when an error code is "5116 (hexadecimal digit)" is "error has occurred in automatic nozzle checking process". An error message corresponding to when an error code is "6106 (hexadecimal digit)" is "remaining ink is below lower limit". Therefore, in this embodiment, the first memory 132 functions as a storage unit.

In the second memory 133, display formats of character strings to be displayed in a second display region 142 (see FIG. 10) of the monitor 123 are stored in association with corresponding error codes. A display format shown in FIG. 9 is an example of a format corresponding to when the error code is "6106 (hexadecimal digit)". Specifically, the display format includes the error message (see FIG. 8) corresponding to the error code, all of the identification codes S21, S22, S23, S24, S11, S12, S13, and S14 to be input, and the identification code S35. Therefore, in this embodiment, the second memory 133 also functions as a storage unit. In FIG. 8, "%11s" refers to a part where a character string based on a correspondence value D(11) with an identification code of "11 (hexadecimal digit)" is set.

Figure 10:
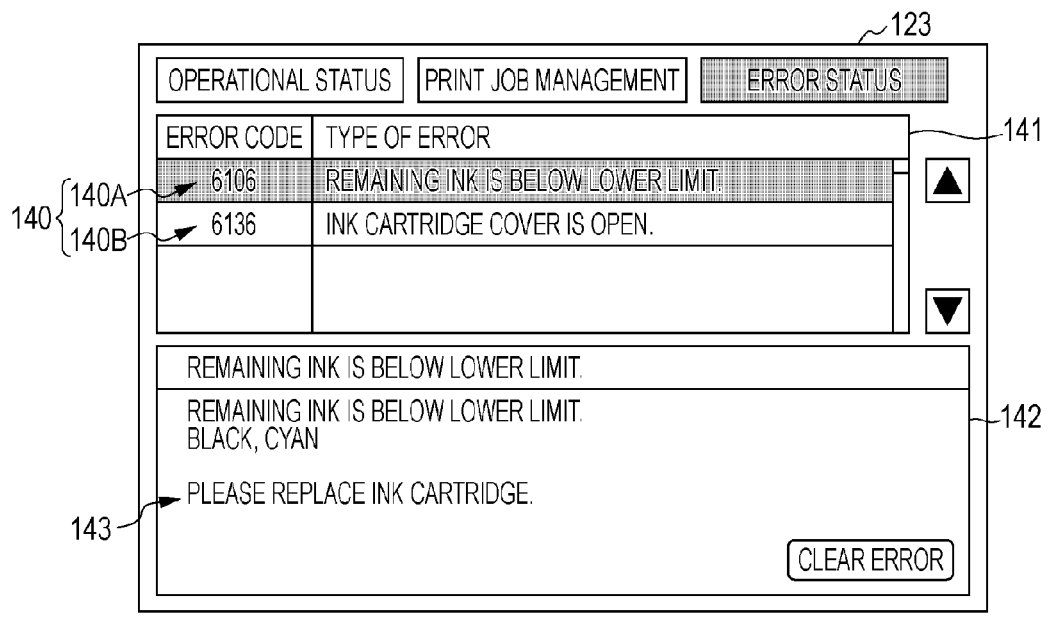
FIG. 10 schematically illustrates an example of an error screen.

If the error commands or the integrated command is/are input from the command analyzing section 130 or the integrating section 131, the display control section 134 controls the display mode (output mode) of the monitor 123 on the basis of the input command or commands. Specifically, the display control section 134 reads an error message based on the error code included in the integrated command (or the error commands) from the table T1 in the first memory 132. Referring to FIG. 10, the display control section 134 displays error information 140 including the error code and the error message in the first display region 141 located at an upper side within the monitor 123. In this case, if there is already displayed error information 140A, the display control section 134 displays error information 140B related to a currently detected error below the error information 140A. Therefore, in this embodiment, the display control section 134 functions as an output-mode control unit.

Furthermore, the display control section 134 displays detailed information related to error information (i.e., the error information 140A in FIG. 10) selected by the user operating the operable section 124 in the second display region 142 located below the first display region 141 in the monitor 123. Specifically, the display control section 134 reads a display format corresponding to the error code of the error information 140A selected by the user from the second memory 133. Then, the display control section 134 sets a character string including correspondence values corresponding to the identification codes S21 to S24 and S11 to S14 included in the integrated command (or the error commands) into the read display format.

In this case, for example, if the correspondence value D(21) of the identification code S21 (=11 (hexadecimal digit)) is null data, "%11s" in the display format is left blank. Furthermore, for example, if the correspondence value D(11) of the identification code S11 (=18 (hexadecimal digit)) is a numerical value (e.g., 2C (hexadecimal digit)) other than null data, a character string (e.g., black) corresponding to "2C (hexadecimal digit)" is set as "%18s" in the display format. If the correspondence value D(FF) is a numerical value other than null data, a character string (in this case, "please replace ink cartridge") following "% FFb" is displayed in the second display region 142. On the other hand, if the correspondence value D(FF) is null data, the character string following "% FFb" is not displayed in the second display region 142.

Figure 11:
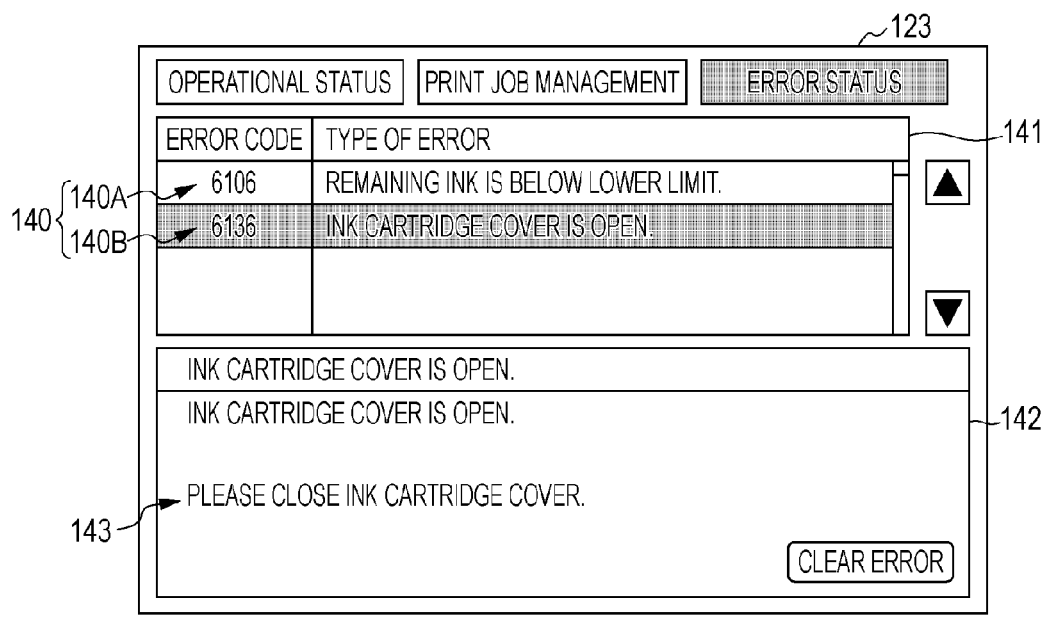
FIG. 11 schematically illustrates another example of an error screen.

As shown in FIG. 10, the display control section 134 displays a detailed-information message 143 corresponding to the display format read from the second memory 133 in the second display region 142 of the monitor 123. If the error information selected by the user is changed in the first display region 141, the display control section 134 changes the detailed-information message 143 in the second display region 142, as shown in FIG. 11.

With the embodiment described above, the following advantages can be achieved.

First Advantage

When the same error command is input to the host controller 125 from the controllers 41 and 42, a single piece of error information 140 including the error code included in the error command and the message corresponding to the error code is displayed in the first display region 141 of the monitor 123. This prevents multiple pieces of error information 140 with exactly identical display contents from being displayed in the first display region 141.

Furthermore, unlike a case where identical pieces of error information 140 are displayed in the first display region 141, the user can determine whether multiple errors have occurred or only a single error has occurred in the printer 11 by simply visually checking the first display region 141. Specifically, this reduces the possibility of giving the user a feeling of annoyance with regard to the display mode in the first display region 141.

Second Advantage

If an error detected by the master controller 41 is identical to an error detected by the slave controller 42, the master controller 41 generates an error command that is identical to that generated in the slave controller 42, and outputs the error command to the host controller 125. Then, when the same error command is input from the controllers 41 and 42, the host controller 125 displays a single piece of error information 140 including the error code included in the error command and the message corresponding to the error code in the first display region 141. This prevents multiple pieces of error information 140 with exactly identical display modes from being displayed in the first display region 141.

Third Advantage

If the same error is detected by the controllers 41 and 42, the error commands input to the host controller 125 from the controllers 41 and 42 include identical error codes. In addition, if the error occurrence location is the same, the first error command includes a parameter that is identical to a parameter included in the second error command. This prevents multiple pieces of error information 140 with exactly identical display contents from being displayed in the first display region 141.

Fourth Advantage

If an error in the mechanical controller 43 or an error in the mechanical mechanism 44 is detected, the mechanical controller 43 that controls the driving of the mechanical mechanism 44 outputs the error occurrence information to the controllers 41 and 42. In this embodiment, the slave controller 42 receives the error occurrence information via the master controller 41. Then, the master controller 41 generates an error command that is identical to an error command generated in the slave controller 42, and outputs the error command to the host controller 125. As a result, the host controller 125 receives identical error commands from the controllers 41 and 42. In this case, since the error commands are identical, a single piece of error information 140 is displayed in the first display region 141. This prevents multiple pieces of error information 140 with exactly identical display modes from being displayed in the first display region 141 when an error occurs in the mechanical mechanism 44 or the mechanical controller 43.

Fifth Advantage

If the error code included in the first error command is identical to the error code included in the second error command, an integrated command including the error code, the parameter included in the first error command, and the parameter included in the second error command is generated. Then, a single piece of error information 140 including the error code included in the integrated command and an error message based on the error code is output from the first display region 141. This prevents identical pieces of error information 140 from being displayed in the first display region 141.

Sixth Advantage

Supposing that an error command that does not include identification codes is generated at each of the controllers 41 and 42, the data length of the error command changes depending on the number of error occurrence locations. In this case, it is difficult for the host controller 125 to analyze the input error command. In this regard, an error command in this embodiment includes identification codes and a parameter corresponding to an error occurrence location, which are set in correspondence with each other, and a parameter corresponding to a location where an error has not occurred is set as null data. Therefore, the data length of error commands having identical error codes is fixed regardless of the number of error occurrence locations. Consequently, the host controller 125 can readily analyze an error command, unlike a case where an error command not including identification codes is input.

Seventh Advantage

The second display region 142 displays detailed information (i.e., the detailed-information message 143) of error information selected by the user. Therefore, the user can readily check where an error has occurred by visually checking the second display region 142.

Second Embodiment

Next, a second embodiment according to the invention will be described with reference to FIGS. 12 to 16. The second embodiment differs from the first embodiment in how an error command is generated at each of the controllers 41 and 42. Therefore, the following description will mainly include descriptions of parts that differ from those in the first embodiment. Components that are the same as or equivalent to those in the first embodiment are given the same reference numerals, and redundant descriptions thereof will be omitted.

Figures 12, 13:
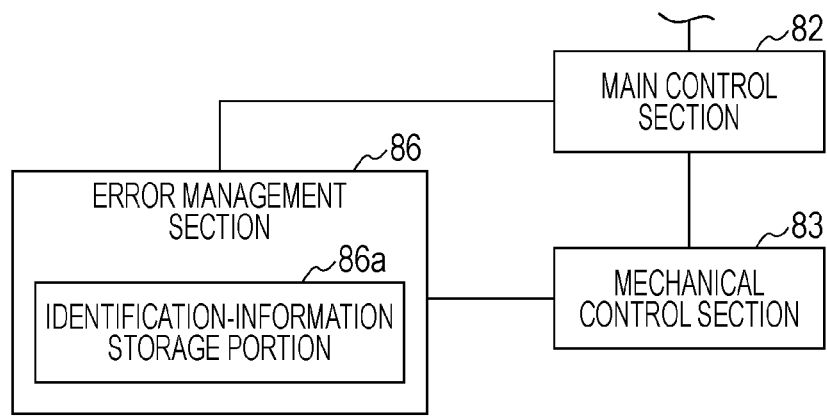
FIG. 12 is a block diagram illustrating a partial configuration of a controller according to a second embodiment.
FIG. 13 illustrates a table that stores the necessity of identification for each error code.

As shown in FIG. 12, the error management section 86 in each of the controllers 41 and 42 has an identification-information storage portion 86a. The identification-information storage portion 86a stores a table T2 shown in FIG. 13. As shown in FIG. 13, the table T2 is used for determining whether or not it is necessary to identify which one of the controllers 41 and 42 has detected an error for each error code (i.e., for each error content). In this embodiment, an error code corresponding to an error and an error occurrence location that can be detected by the master controller 41 and also by the slave controller 42 is set so as not to require identification. For example, since an error in the mechanical controller 43 or an error in the mechanical mechanism 44 can be detected by both controllers 41 and 42, an error code corresponding to the error is set so as not to require identification. Specifically, an error code corresponding to an error occurring in a section cooperatively managed by the controllers 41 and 42 is set so as not to require identification.

On the other hand, an error code corresponding to an error and an error occurrence location that can be detected by the master controller 41 but cannot be detected by the slave controller 42 is set so as to require identification. For example, since the slave controller 42 cannot detect an error (e.g., ink shortage) in the ink cartridges IC1 to IC4 managed by the master controller 41, an error code corresponding to such an error is set so as to require identification. Specifically, an error code corresponding to an error in the managed sections individually managed by each controller 41 or 42 or an error in the controller itself is set so as to require identification.

Figure 14:
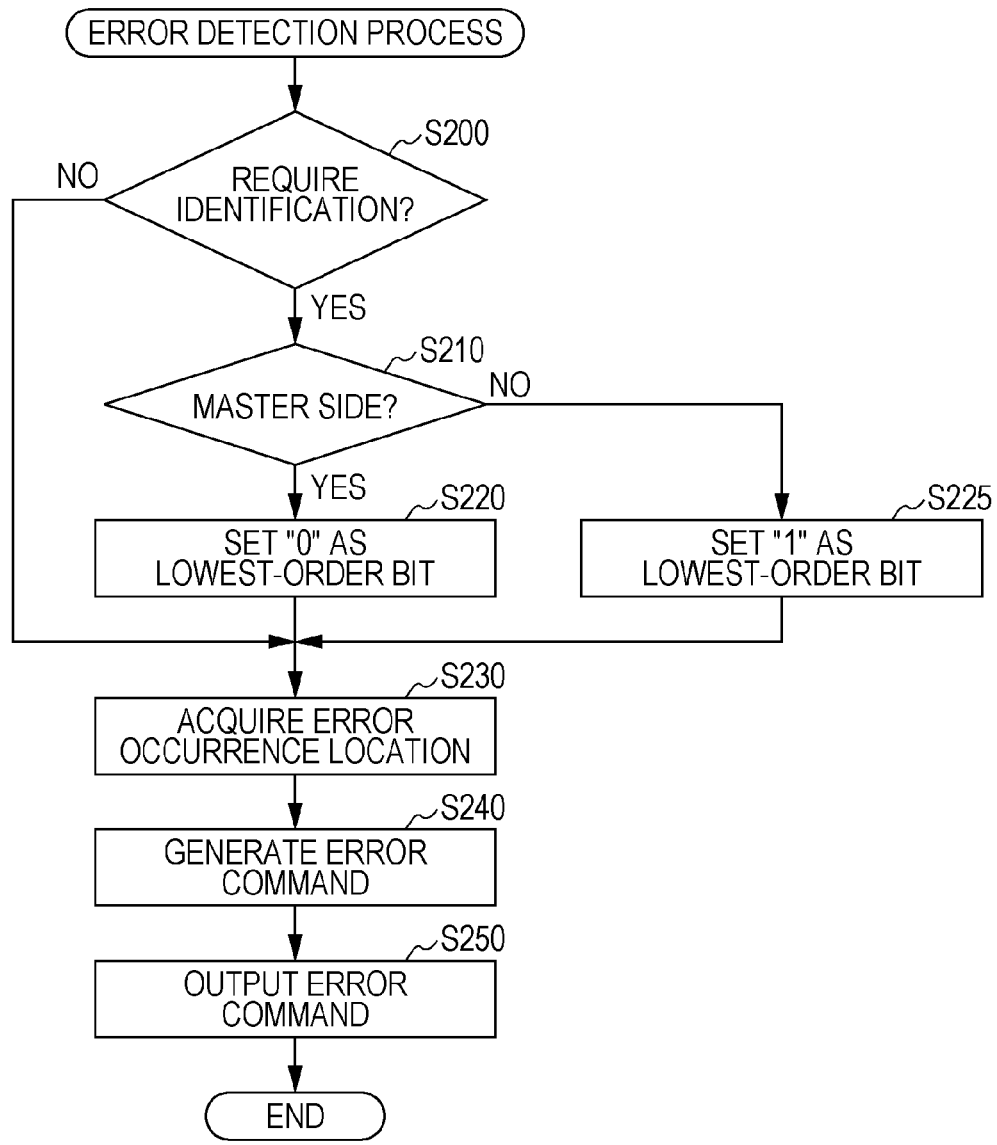
FIG. 14 is a flow chart illustrating an error detection routine in the second embodiment.

Next, an error detection routine executed by each error management section 86 in this embodiment will be described with reference to a flow chart shown in FIG. 14. This error detection routine is for generating an error command and outputting the generated error command to the main control section 82.

When an error code and error occurrence information are input, the error management section 86 executes the error detection routine. In step S200, the error management section 86 determines whether or not the input error code is an error code that requires identification by using the table T2. If it is determined that identification is not required (NO in step S200), the error management section 86 proceeds to step S230, to be described later. On the other hand, if it is determined that identification is required (YES in step S200), the error management section 86 proceeds to step S210.

In step S210, the error management section 86 determines whether or not the error management section 86 is at the master side or the slave side. If the error management section 86 is at the master side (YES in step S210), the error management section 86 sets "0 (binary digit)" as a lowest-order bit of the error code (step S220) and then proceeds to step S230. For example, if the input error code is "5116 (hexadecimal digit)", the error code is not changed. On the other hand, if the error management section 86 is at the slave side (NO in step S210), the error management section 86 sets "1 (binary digit)" as the lowest-order bit of the error code (step S225) and then proceeds to step S230. For example, if the input error code is "5116 (hexadecimal digit)", the error code is set to "5117 (hexadecimal digit)". Specifically, in this embodiment, the error code is set on the basis of which one of the controllers 41 and 42 has detected the error. Therefore, in this embodiment, the error management section 86 also functions as a code setting unit.

In step S230, the error management section 86 acquires an error occurrence location. In step S240, the error management section 86 generates an error command including the set error code and a parameter according to the acquired error occurrence location. In step S250, the error management section 86 outputs the generated error command to the main control section 82 and ends the error detection routine. Then, the main control section 82 having received the error command transfers the error command to the host apparatus 120 via the serial communication port U3 (or U4).

For example, even when an error code corresponds to an error such as an ink shortage in one of the ink cartridges IC, an error code included in an error command from the master controller 41 and an error code included in an error command from the slave controller 42 differ from each other in this embodiment.

Next, the host controller 125 acting as an error-command transfer destination will be described while focusing on the differences from the first embodiment.

Like the first embodiment, the host controller 125 includes the command analyzing section 130, the integrating section 131, the first memory 132, the second memory 133, and the display control section 134. The first memory 132 stores a table T3 shown in FIG. 15. The table T3 shows the correspondence relationship between error codes and error messages to be displayed in the first display region 141 of the monitor 123. As shown in FIG. 15, an error message corresponding to when an error code is "5216 (hexadecimal digit)" is "error has occurred in automatic nozzle checking process in master controller". An error message corresponding to when an error code is "5217 (hexadecimal digit)" is "error has occurred in automatic nozzle checking process in slave controller".

Similarly, an error message corresponding to when an error code is "6106 (hexadecimal digit)" is "remaining ink is below lower limit at upper level". An error message corresponding to when an error code is "6107 (hexadecimal digit)" is "remaining ink is below lower limit at lower level". Accordingly, when the master side and the slave side are distinguished from each other, the user can visually check which one of the controllers an error has been detected or occurred in.

Next, an example of a display screen of the monitor 123 will be described with reference to a schematic diagram shown in FIG. 16. FIG. 16 illustrates an example of a display mode corresponding to when the controllers 41 and 42 have individually detected ink shortages in the ink cartridges IC.

If an ink shortage is detected in any of the ink cartridges IC1 to IC4 managed by the master controller 41, the master controller 41 generates an error command including an error code (in this case, "6106 (hexadecimal digit)") according to the error content and a parameter corresponding to the empty ink cartridge. The error command is then transferred to the host controller 125. The error command generated by the master controller 41 will be referred to as "first error command".

If an ink shortage is detected in any of the ink cartridges IC5 to IC8 managed by the slave controller 42, the slave controller 42 generates an error command including an error code (in this case, "6107 (hexadecimal digit)") according to the error content and a parameter corresponding to the empty ink cartridge. The error command is then transferred to the host controller 125. The error command generated by the slave controller 42 will be referred to as "second error command".

Then, the host controller 125 determines whether or not the first error command and the second error command are exactly identical to each other. In this case, since the first error command and the second error command are not identical, it is determined whether or not the error code (6106 (hexadecimal digit)) included in the first error command and the error code (6107 (hexadecimal digit)) included in the second error command are identical to each other.

Because the error code included in the first error command and the error code included in the second error command are not identical, the host controller 125 determines that two errors have occurred in the printer 11. Then, an error message based on the error code included in the first error command is read from the table T3, and error information 140A including the error code and the error message is displayed in the first display region 141. Furthermore, an error message based on the error code included in the second error command is read from the table T3, and error information 140B including the error code and the error message is displayed in the first display region 141.

Accordingly, in this embodiment, the following advantages can be achieved in addition to the first to fourth advantages in the first embodiment.

Eight Advantage

When an error in the master controller 41 or the managed sections (i.e., the ink cartridges IC or the recording heads 29B) managed by the master controller 41 is detected, the master controller 41 generates an error code on the basis of the error content, the error occurrence location, and the master controller 41. Then, an error command including the error code is output to the host controller 125. On the other hand, when an error in the slave controller 42 or the managed sections managed by the slave controller 42 is detected, the slave controller 42 generates an error code on the basis of the error content, the error occurrence location, and the slave controller 42. Then, an error command including the error code is output. Therefore, even when the host controller 125 receives the error commands from the controllers 41 and 42, the host controller 125 recognizes the error commands as different errors. Multiple pieces of error information 140A and 140B with different error codes can be displayed in the first display region 141.

Ninth Advantage

The error code and the error message included in the error information 140A differs from the error code and the error message included in the error information 140B. This prevents multiple pieces of error information 140 with exactly identical contents from being displayed in the first display region 141, thereby reducing the possibility of giving the user a feeling of annoyance.

The above-described embodiments may be modified as follows.

Figure 17A:
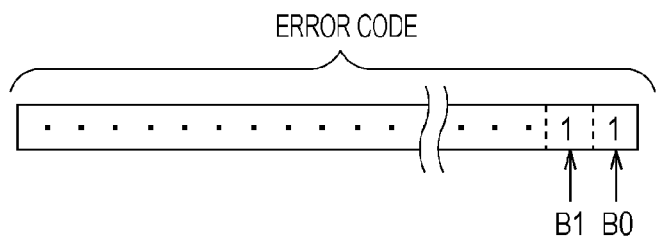
FIGS. 17A and 17B schematically illustrate a relevant part of an error code according to another embodiment.
Figure 17B:
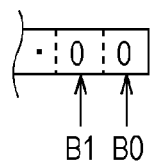
Figure 18:
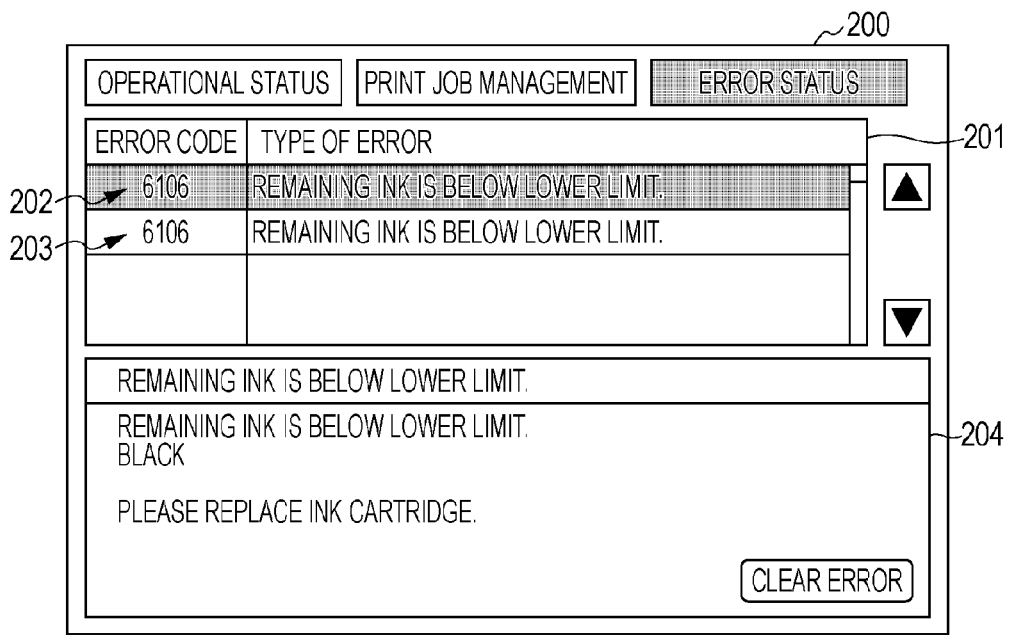
FIG. 18 schematically illustrates an example of an error screen in the related art.

In the second embodiment, an error code may be set as follows. For example, as shown in FIGS. 17A and 17B, a lowest-order bit (i.e., 0 bit) of the error code may be set as a bit B0 for identifying which one of the controllers 41 and 42 has detected an error, and 1 bit may be set as a bit B1 for detecting whether or not it is necessary to distinguish the controller 41 or 42 that has detected the error. In this case, if the bit B1 of the input error code is "1 (binary digit)", the error management section 86 of the slave controller 42 sets "1" as the bit B0 (see FIG. 17A). On the other hand, if the bit B1 of the input error code is "0 (binary digit)", the error management section 86 of the slave controller 42 sets "0" as the bit B0 (see FIG. 17B). In this case, it is not necessary to store the table T2 shown in FIG. 13 in the storage portion of the error management section 86, thereby contributing to a reduction in storage capacity of the controllers 41 and 42.

In each of the above embodiments, since an error in the mechanical controller 43 or an error in the mechanical mechanism 44 can be detected individually by the controllers 41 and 42, error commands are respectively output from the controllers 41 and 42, and a single piece of error information 140 is displayed in the first display region 141. However, an error in the managed sections is sometimes detected by the mechanical controller 43. For example, in a case where an ink-leakage detection sensor is provided for each of the ink cartridges IC1 to IC8, the mechanical controller 43 can detect which one of the ink cartridges IC an ink leakage has occurred in. In this case, an error command may be generated so as to be capable of identifying which one of the ink cartridges IC managed by the controller 41 or 42 an ink leakage has occurred in.

If this is to be applied to the second embodiment, an error code corresponding to when an ink leakage has occurred in an ink cartridge IC managed by the master controller 41 differs from an error code corresponding to when an ink leakage has occurred in an ink cartridge IC managed by the slave controller 42.

If this is to be applied to the first embodiment, the error codes are identical between the master side and the slave side, but a parameter is set in accordance with the ink cartridge IC in which an ink leakage has occurred.

In each of the above embodiments, the error information 140 displayed in the first display region 141 may be information including one of an error code and an error message corresponding to the error code.

In each of the above embodiments, the output unit is not limited to a display unit such as the monitor 123. Alternatively, the output unit may be a speaker that can output sound or may be a dedicated printer for outputting error information.

In each of the above embodiments, the controllers 41 and 42 may have different configurations. For example, the dummy mechanical control section 97 may be omitted from the imaginary mechanical controller 85, or the imaginary mechanical control section 96 may be omitted from the dummy mechanical controller 95.

In each of the above embodiments, the control device C may alternatively include multiple (e.g., two) slave controllers.

In each of the above embodiments, the printer 11 may be a serial-type printer or a so-called line-type printer that does not move the recording heads 29 during printing, so long as the printer 11 has multiple recording heads 29.

Although an ink jet printer is employed as the printer 11 in each of the above embodiments, a fluid ejecting apparatus that ejects or emits a fluid other than ink may be employed as an alternative. Furthermore, the invention can also be applied to various kinds of liquid ejecting apparatuses that include liquid ejecting heads that eject small liquid droplets. In that case, the term "liquid droplet" refers to the state of the liquid ejected from the aforementioned liquid ejecting apparatus and can also include a particulate droplet, a teardrop-like droplet, or a viscous droplet. In addition, the liquid used here may be a material that can be ejected from the liquid ejecting apparatus. For example, the liquid may be a material in its liquid phase, and may include a fluid material, such as a liquid material with high or low viscosity, sol, gel water, an inorganic solvent, an organic solvent, a solution, liquid resin, or liquid metal (metallic melt). Moreover, in addition to a liquid material in one phase, the aforementioned liquid may include a material in which particles of a functional material composed of a solid material, such as a pigment or metallic particles, are dissolved, diffused, or mixed in a solvent. Typical examples of the liquid include ink, as described in the above embodiments, and liquid crystal. In this case, the term "ink" includes various kinds of liquid compositions, such as water-based ink, oil-based ink, gel ink, and hot melt ink. A specific example of the liquid ejecting apparatus includes a liquid ejecting apparatus that ejects a liquid containing a material, such as a colorant or an electrode material used for manufacturing liquid crystal displays, electroluminescence (EL) displays, field emission displays, and color filters, in a dissolved or diffused state. Other examples of the liquid ejecting apparatus include a liquid ejecting apparatus that ejects a bioorganic material used for manufacturing biochips, a liquid ejecting apparatus that is used as a precision pipette and ejects a liquid that is to become a sample, a textile printing apparatus, and a micro-dispenser. Further examples of the liquid ejecting apparatus include a liquid ejecting apparatus that precisely ejects a lubricant to a precision device, such as a clock or a camera, a liquid ejecting apparatus that ejects a transparent resin liquid, such as ultraviolet curable resin, onto a substrate for forming a micro semispherical lens (optical lens) used in an optical communication device or the like, and a liquid ejecting apparatus that ejects an acidic or alkali etching liquid for etching a substrate or the like. The invention can be applied to any one of these types of liquid ejecting apparatuses. Furthermore, the fluid may be a particulate material, such as toner. The term "fluid" used in this description does not include a material composed of gas alone.

An apparatus equipped with the information processing system according to each of the above embodiments of the invention may be applied to an apparatus other than a printing apparatus.

Next, technical ideas that can be ascertained from the above embodiments and another embodiment will be described below.

In the information processing system according to one embodiment of the invention, the output unit has a display screen provided with a first display region and a second display region positionally different from the first display region. The output control apparatus includes a storage unit that stores error codes and multiple kinds of display formats, to be displayed in the second display region, in correspondence with each other. Each of the display formats includes a message based on the corresponding error code and all of identification codes that can be input. When an error command is input to the output-mode control unit, the output-mode control unit causes the first display region to display a single piece of error information including at least one of an error code included in an error command input from the corresponding information processing device and a message based on the error code, reads a display format based on the error code included in the input error command from the storage unit, sets a character string corresponding to a parameter that corresponds to an identification code included in the input error command among identification codes included in the read display format, and causes the second display region to display the set character string and a message included in the read display format.

In the information processing system according to another embodiment of the invention, the first information processing device and the second information processing device have set therein identification codes constituted of different character strings.

In the information processing system according to another embodiment of the invention, the output unit has a display screen provided with a first display region and a second display region positionally different from the first display region. Regarding an error code included in an error command input from the corresponding information processing device and a message based on the error code, the output-mode control unit causes the first display region to display error information at least including the error code. In addition, the output-mode control unit causes the second display region to display detailed information including the message based on the error information selected in the first display region and information based on a parameter included in the error command input from the information processing device.

What is claimed is:

1. An information processing system comprising:
a plurality of information processing devices; and
an output control apparatus that controls an output mode in an output unit on the basis of a command input from at least one of the information processing devices,
wherein each information processing device includes a command generating unit that generates an error command including an error code indicating the content of an error when the information processing device detects the error,
wherein the output control apparatus includes an output-mode control unit, wherein when an error command input from a first information processing device among the plurality of information processing devices and an error command input from a second information processing device that is different from the first information processing device are identical to each other, the output-mode control unit causes the output unit to output a single piece of error information including at least one of the error code included in the error command and a message corresponding to the error code, and
wherein the single piece of error information does not include duplicate information.

2. The information processing system according to claim 1, wherein when an error that is not detected by the second information processing device is detected by the first information processing device, the command generating unit of the first information processing device generates an error command including an error code indicating the content of the error and a parameter indicating a location where the error has occurred,
wherein when an error that is identical to an error detected by the second information processing device is detected by the first information processing device, the command generating unit of the first information processing device generates an error command including an error code indicating the content of the error but not including a parameter indicating a location where the error has occurred or generates an error command including an error code indicating the content of the error and a parameter identical to a parameter set in the second information processing device.

3. A printing apparatus comprising:
a plurality of print heads that perform printing on a print medium by using a fluid;
a mechanical mechanism having a transport unit that moves the print medium relatively to the print heads; and
the information processing system according to claim 2,
wherein the first information processing device controls a first print head among the plurality of print heads, and
wherein the second information processing device controls a second print head that is different from the first print head.

4. The information processing system according to claim 1, further comprising a drive control device that controls a mechanical mechanism on the basis of a command from at least one of the plurality of information processing devices,
wherein when an error in the drive control device or an error in the mechanical mechanism is detected, the drive control device outputs error occurrence information regarding the error to each information processing device, and
wherein when the error occurrence information is input from the drive control device, the command generating unit of the first information processing device generates an error command that is identical to an error command generated by the command generating unit of the second information processing device.

5. A printing apparatus comprising:
a plurality of print heads that perform printing on a print medium by using a fluid;
a mechanical mechanism having a transport unit that moves the print medium relatively to the print heads; and
the information processing system according to claim 4,
wherein the first information processing device controls a first print head among the plurality of print heads, and
wherein the second information processing device controls a second print head that is different from the first print head.

6. The information processing system according to claim 1, wherein each information processing device manages at least one managed section,
wherein when an error in the information processing device or an error in the at least one managed section is detected, the corresponding command generating unit generates an error command including an error code indicating the content of the error and a parameter corresponding to a location where the error has occurred,
wherein the output control apparatus includes
a command determination unit that determines whether or not a first error command input from the first information processing device and a second error command input from the second information processing device are identical to each other,
a code determination unit that determines whether or not an error code included in the first error command and an error code included in the second error command are identical to each other if the command determination unit determines that the first error command and the second error command are not identical, and
an integrating unit that generates an integrated command including the error code, a parameter included in the first error command, and a parameter included in the second error command if the code determination unit determines that the error code included in the first error command and the error code included in the second error command are identical, and
wherein the output-mode control unit causes the output unit to output a single piece of error information including at least one of the error code included in the integrated command generated by the integrating unit and a message based on the error code if the code determination unit determines that the error code included in the first error command and the error code included in the second error command are identical.

7. The information processing system according to claim 6, wherein each error command includes an error code, a plurality of identification codes, and a code indicating a location corresponding to each identification code,
wherein when an error in the information processing device or an error in the at least one managed section is detected, the corresponding command generating unit sets null data for a code corresponding to a first identification code among the plurality of identification codes if the error has not occurred at a location corresponding to the first identification code, and sets a parameter that corresponds to a location corresponding to a second identification code among the plurality of identification codes if the error has occurred at the location corresponding to the second identification code.

8. A printing apparatus comprising:
a plurality of print heads that perform printing on a print medium by using a fluid;
a mechanical mechanism having a transport unit that moves the print medium relatively to the print heads; and
the information processing system according to claim 7,
wherein the first information processing device controls a first print head among the plurality of print heads, and
wherein the second information processing device controls a second print head that is different from the first print head.

9. A printing apparatus comprising:
a plurality of print heads that perform printing on a print medium by using a fluid;
a mechanical mechanism having a transport unit that moves the print medium relatively to the print heads; and
the information processing system according to claim 6,
wherein the first information processing device controls a first print head among the plurality of print heads, and
wherein the second information processing device controls a second print head that is different from the first print head.

10. The information processing system according to claim 1, wherein each information processing device manages at least one managed section,
wherein each of the information processing devices further includes a code setting unit that sets an error code,
wherein when an error in the information processing device or an error in the at least one managed section is detected, the corresponding code setting unit sets an error code based on the information processing device from which the content of the error, a location where the error has occurred, and an error command are output, and
wherein the command generating unit generates the error command including the error code set by the code setting unit.

11. A printing apparatus comprising:
a plurality of print heads that perform printing on a print medium by using a fluid;
a mechanical mechanism having a transport unit that moves the print medium relatively to the print heads; and
the information processing system according to claim 10,
wherein the first information processing device controls a first print head among the plurality of print heads, and wherein the second information processing device controls a second print head that is different from the first print head.

12. The information processing system according to claim 1, wherein the output control apparatus further includes a storage unit that stores different messages for individual error codes,
wherein when an error command is input, the output-mode control unit reads a message corresponding to the error code included in the error command from the storage unit and causes the output unit to output error information including the read message.

13. A printing apparatus comprising:
a plurality of print heads that perform printing on a print medium by using a fluid;
a mechanical mechanism having a transport unit that moves the print medium relatively to the print heads; and
the information processing system according to claim 12,
wherein the first information processing device controls a first print head among the plurality of print heads, and
wherein the second information processing device controls a second print head that is different from the first print head.

14. A printing apparatus comprising:
a plurality of print heads that perform printing on a print medium by using a fluid;
a mechanical mechanism having a transport unit that moves the print medium relatively to the print heads; and
the information processing system according to claim 1,
wherein the first information processing device controls a first print head among the plurality of print heads, and
wherein the second information processing device controls a second print head that is different from the first print head.

15. An information processing system comprising:
a plurality of information processing devices; and
an output control apparatus that controls an output mode in an output unit on the basis of a command input from at least one of the information processing devices,
wherein each information processing device includes a command generating unit that generates an error command including an error code indicating the content of an error when the information processing device detects the error,
wherein the command generating unit of a first information processing device among the plurality of information processing devices generates an error command that is identical to an error command generated by the command generating unit of a second information processing device that is different from the first information processing device when an error whose content is the same as that of an error detected by the second information processing device is detected by the first information processing device,
wherein the output control apparatus includes an output-mode control unit, wherein when the error command input from the first information processing device and the error command input from the second information processing device are identical to each other, the output-mode control unit causes the output unit to output a single piece of error information including at least one of the error code included in the error command and a message corresponding to the error code, and
wherein the single piece of error information does not include duplicate information.

16. A printing apparatus comprising:
a plurality of print heads that perform printing on a print medium by using a fluid;
a mechanical mechanism having a transport unit that moves the print medium relatively to the print heads; and
the information processing system according to claim 15,
wherein the first information processing device controls a first print head among the plurality of print heads, and
wherein the second information processing device controls a second print head that is different from the first print head.

17. An information processing method in an information processing system including a plurality of information processing devices and an output control apparatus that controls an output mode in an output unit on the basis of a command input from at least one of the information processing devices, the method comprising:
causing the information processing devices that have detected an error to generate error commands each including an error code indicating the content of the error and to output the error commands to the output control apparatus; and
outputting a single piece of error information from the output unit when the error command input to the output control apparatus from a first information processing device among the plurality of information processing devices and the error command input to the output control apparatus from a second information processing device that is different from the first information processing device are identical to each other, the single piece of error information including at least one of the error code included in the error command and a message corresponding to the error code,
wherein the single piece of error information does not include duplicate information.

18. An information processing method in an information processing system including a plurality of information processing devices and an output control apparatus that controls an output mode in an output unit on the basis of a command input from at least one of the information processing devices, the method comprising:
causing a first information processing device among the plurality of information processing devices to generate an error command and output the error command to the output control apparatus when an error is detected by the first information processing device, the error command including an error code indicating the content of the error,
causing a second information processing device that is different from the first information processing device to generate an error command identical to the error command generated by the first information processing device and to output the error command to the output control apparatus when an error whose content is the same as that of the error detected by the first information processing device is detected by the second information processing device; and
outputting a single piece of error information from the output unit when the error command input to the output control apparatus from the first information processing device and the error command input to the output control apparatus from the second information processing device are identical to each other, the single piece of error information including at least one of the error code included in the error command and a message corresponding to the error code, and
wherein the single piece of error information does not include duplicate information.

* * * * *